US007605775B2

(12) United States Patent
Kobayashi et al.

(10) Patent No.: US 7,605,775 B2
(45) Date of Patent: Oct. 20, 2009

(54) DISPLAYING OPTICAL SYSTEM

(75) Inventors: Shuichi Kobayashi, Yokohama (JP);
Akira Yamamoto, Yokohama (JP);
Naosato Taniguchi, Saitama (JP)

(73) Assignee: Canon Kabushiki Kaisha (JP)

( * ) Notice: Subject to any disclaimer, the term of this patent is extended or adjusted under 35 U.S.C. 154(b) by 737 days.

(21) Appl. No.: 11/313,999

(22) Filed: Dec. 20, 2005

(65) Prior Publication Data
US 2006/0131492 A1  Jun. 22, 2006

(30) Foreign Application Priority Data
Dec. 21, 2004  (JP)  ............... 2004-368882

(51) Int. Cl.
*G09G 5/00*  (2006.01)
(52) U.S. Cl. ........................................... 345/7
(58) Field of Classification Search ................ 345/7,
345/8, 9; 359/196–226.3
See application file for complete search history.

(56) References Cited

U.S. PATENT DOCUMENTS

| 4,796,965 | A | * | 1/1989 | Ishikawa ................ 359/217 |
| 5,004,311 | A | * | 4/1991 | Peppers ................. 359/208 |
| 5,004,929 | A | * | 4/1991 | Kakinoki et al. ....... 250/559.06 |
| 5,467,104 | A |  | 11/1995 | Furness, III et al. |
| 5,621,561 | A | * | 4/1997 | Belfatto et al. ............ 359/205 |
| 5,701,132 | A |  | 12/1997 | Kollin et al. |
| 6,362,912 | B1 |  | 3/2002 | Lewis et al. |
| 6,807,329 | B2 | * | 10/2004 | Zalevsky et al. ........... 385/16 |
| 7,119,935 | B2 | * | 10/2006 | Yamaguchi ............... 359/212 |
| 2004/0232322 | A1 |  | 11/2004 | Kobayashi et al. |

FOREIGN PATENT DOCUMENTS

| JP | 2001-4955 | 1/2001 |
| JP | 2001-194617 | 7/2001 |
| JP | 2003-161915 | 6/2003 |
| JP | 2004-45496 | 2/2004 |

* cited by examiner

*Primary Examiner*—Richard Hjerpe
*Assistant Examiner*—Tom V Sheng
(74) *Attorney, Agent, or Firm*—Rossi, Kimms & McDowell LLP

(57) ABSTRACT

Disclosed is a displaying optical system including: a scanning member for deflecting a light emitted from a light source; a scanned surface on which an image is formed by the light deflected by the scanning member; an optical surface provided at a position common to a first optical path through which a light reflected by the scanned surface travels and a second optical path through which a light from the scanning member to the scanned surface travels; and a phase plate being provided at the position common to the first optical path and the second optical path. The optical surface, in accordance with a polarization direction, transmits the light traveling through one of the first optical path and the second optical path and reflects the light traveling through the other optical path.

4 Claims, 22 Drawing Sheets

DISPLAYING OPTICAL SYSTEM

BACKGROUND OF THE INVENTION

1. Field of the Invention

The present invention relates to a displaying optical system that forms an image by scanning with a light beam. More specifically, the present invention relates to an optical system suitable for, for example, an image display apparatus such as an electronic view finder and a head-mounted display which are installed on an image pickup apparatus such as a digital camera and a digital video camera.

2. Related Background Art

Conventionally, for the electronic view finder and the head-mounted display which are installed on the digital camera, a video camera, and the like, there has been proposed an image display apparatus which allows a two-dimensional display element to display an image, and which displays the image by enlargement by an eye-piece optical system.

In this type of image display device, a large number of pixels are formed on a two-dimensional display element so that an image of a higher resolution can be displayed.

For the two-dimensional display element, there are proposed a large number of kinds of technologies using a transmission-type liquid crystal element, a reflection-type liquid crystal element, an organic EL element, and the like. Among those technologies, there exists an image display device that uses the reflection-type liquid crystal element called Liquid Crystal On Silicon (LCOS). The LCOS changes a state of polarization of an incident light between an ON state and an OFF state of each pixel. The LCOS displays an image to an observer by modulating light of each pixel, by being combined with a polarization beam splitter.

For example, Japanese Patent Application Laid-Open No. 2003-161915 (paragraphs 0012 through 0019, FIG. 1, and the like) discloses an electronic view finder that uses the LCOS.

In the two-dimensional display element such as the LCOS, in order to realize a high resolution, it is necessary to increase the number of pixels formed on the two-dimensional display element. Accordingly, it is necessary to reduce the size of each pixel formed on the display element, so that the manufacture of such an electronic view finder becomes difficult and the number of defective pixels is likely to increase due to the increase in the number of pixels.

On the other hand, for a technology for displaying a high resolution image without using the two-dimensional display element, there exists a scanning type image display device that is proposed in U.S. Pat. No. 5,467,104, for example. In this technology, scanning with a light beam emitted from a light source is performed by two-dimensional deflection means (two-dimensional scanning means), in synchronization with the modulation of the light source, and thus an image is displayed.

In such a scanning type image display device, the resolution is determined on the basis of an area of a scanned surface by the two-dimensional deflection means, a scanning angle, and the modulation of the light source. Therefore, no problem arises such as an increase in defective pixels when a high resolution is effected, contrary to the case of the two-dimensional display element.

Especially, when a micro electro mechanical systems (MEMS device) that is manufactured by applying a semiconductor process technology is used as scanning means, there is an advantage such that it is possible to carry out high-speed scanning with a device with a small size.

Further, U.S. Pat. No. 5,701,132 proposes a technology of enlarging an observation pupil of an observer by disposing NA conversion means that converts an incidence NA and an exit NA, on the scanned surface on which the light beam from the light source is condensed in the scanning type image display device. With this structure, it is possible to enlarge a pupil diameter with less deterioration of the resolution.

On the other hand, for a specific optical system of the scanning type image display device, technologies are proposed in Japanese Patent Application No. 2001-004955 (paragraphs 0236 through 0241, FIG. 20, and the like) and Japanese Patent Application No. 2001-194617 (paragraphs 0067 through 0088, FIG. 2, and the like). The technologies relate to a scanning optical system having an optical surface with one decentered reflection surface of a prism member configured by a medium having a refractive index greater than 1.

In addition, Japanese Patent Application Laid-Open No. 2004-045496 (paragraphs 0008 through 0023, FIG. 1, FIG. 2, and the like) proposes a technology of an optical system suitable for a scanning unit having a gimbal structure in which scanning of a light beam from the light source is performed in a two-dimensional direction. The optical system is a scanning optical system that has a prism member having a rotational asymmetric plane. With this structure, it is possible to obtain a high quality image by correcting a scanning distortion, and further, to provide a small video display apparatus capable of displaying a video with a high brightness by disposing an eye-piece optical system having positive power in the vicinity of the scanned surface.

However, the displaying optical system in the conventional image display apparatus has a basic structure in which a transmitted intermediate imaging plane is observed, and thus the other optical systems are disposed before or after the intermediate image. Therefore, the length of optical paths is significantly long for the optical system, and the size of the image display apparatus becomes significantly large.

Further, in Japanese Patent Application Laid-Open No. 2001-004955 (paragraphs 0236 through 0241, FIG. 20, and the like) and Japanese Patent Application Laid-Open No. 2001-194617 (paragraphs 0067 through 0088, FIG. 2, and the like), an intermediate imaging plane exists within the prism, so it is difficult to enlarge the observation pupil of the observer by disposing the NA conversion means for converting the incidence NA and the exit NA on the intermediate imaging plane, unlike the case disclosed in U.S. Pat. No. 5,701,132.

In Japanese Patent Application Laid-Open No. 2004-045496 (paragraphs 0008 through 0023, FIG. 1, FIG. 2, and the like), the eye-piece optical system having positive power is disposed in the vicinity of the scanned surface. However, the observation is not carried out by enlarging the scanned surface as a virtual image, and accordingly, it is not possible to apply this structure to a small electronic view finder and the like, as it is.

SUMMARY OF THE INVENTION

An object of the present invention is to provide a displaying optical system that is small in size and capable of displaying an image with a high resolution.

According to one aspect of the present invention, a displaying optical system includes: a scanning member for scanning with a light emitted from a light source; a scanned surface on which an image is formed by scanning with the light by the scanning member, the scanned surface being a reflection surface; an optical surface provided at a position common to a first optical path through which a light reflected by the scanned surface travels and a second optical path through which a light from the scanning member to the scanned surface travels; and a phase plate being provided at the position common to the first optical path and the second optical path. The optical surface in accordance with a polarization direction, transmits the light traveling through one of the first optical path and the second optical path and reflects the light traveling through the other optical path.

BRIEF DESCRIPTION OF THE DRAWINGS

FIGS. 11A and 11B are views showing still another form of a light source optical system and a color combining optical system according to the second embodiment of the present invention, in which FIG. 11A shows a structure of a multi-beam optical system, and FIG. 11B shows scanning using a light beam emitted from the multi-beam optical system;

DESCRIPTION OF THE PREFERRED EMBODIMENTS

Embodiments of a displaying optical system of the present invention are explained in detail below with reference to the attached drawings.

First Embodiment

Figure 1:
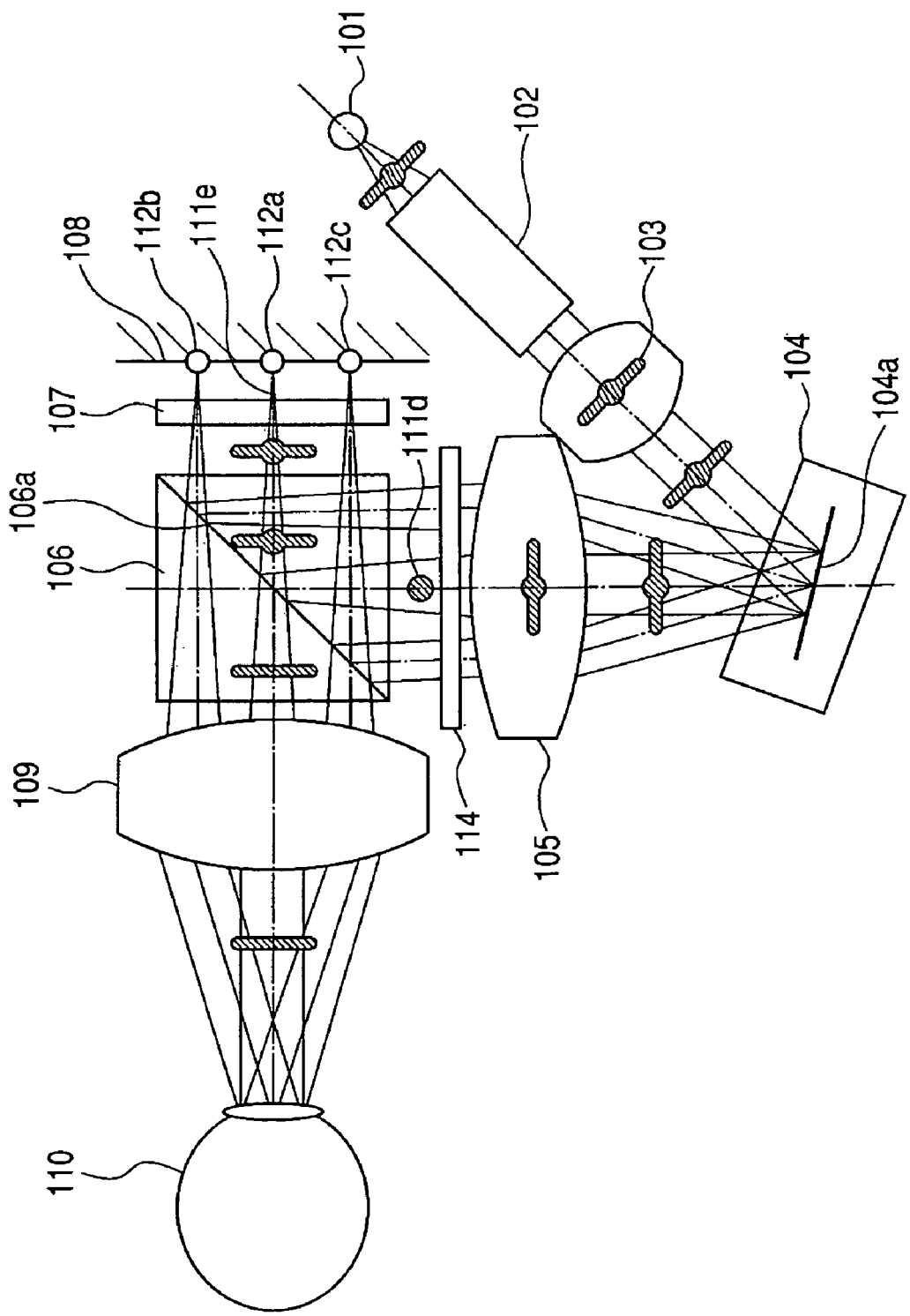
FIG. 1 is a schematic diagram of a structure of a scanning type displaying optical system of an image display apparatus according to a first embodiment of the present invention.

FIG. 1 is a diagram showing a structure of a scanning type displaying optical system of an image display apparatus according to a first embodiment of the present invention.

In FIG. 1, a light source 101 is configured by a laser diode (LD), an LED element, an organic EL element, or the like. An emission intensity of the light source 101 is modulated by a light source driving circuit (modulation circuit) 121, described later, when an image signal is inputted to the light source driving circuit 121. The image signal to be inputted includes an imaging signal produced from an output of an imaging element (photoelectric conversion element) for photoelectrically converting an image of a subject that is formed by an image pickup optical system, and a video signal inputted by an image information supplying apparatus such as a personal computer, a DVD player, and a video cassette recorder. This applies to other embodiments of the present invention.

The light source 101 of this embodiment emits a non-polarized light beam. A light beam emitted from the light source 101 is made incident into a light source optical system 103 via a color combining optical system 102. The light beam is incident into a scanning device 104 after converted into a substantially parallel light beam by the light source optical system 103. The scanning device 104 is a scanning element manufactured by using a micro electro mechanical systems (MEMS) technology, which is to be described later below. The scanning device 104 deflects an incident light beam for scanning at a deflection point 104a.

Figure 3:
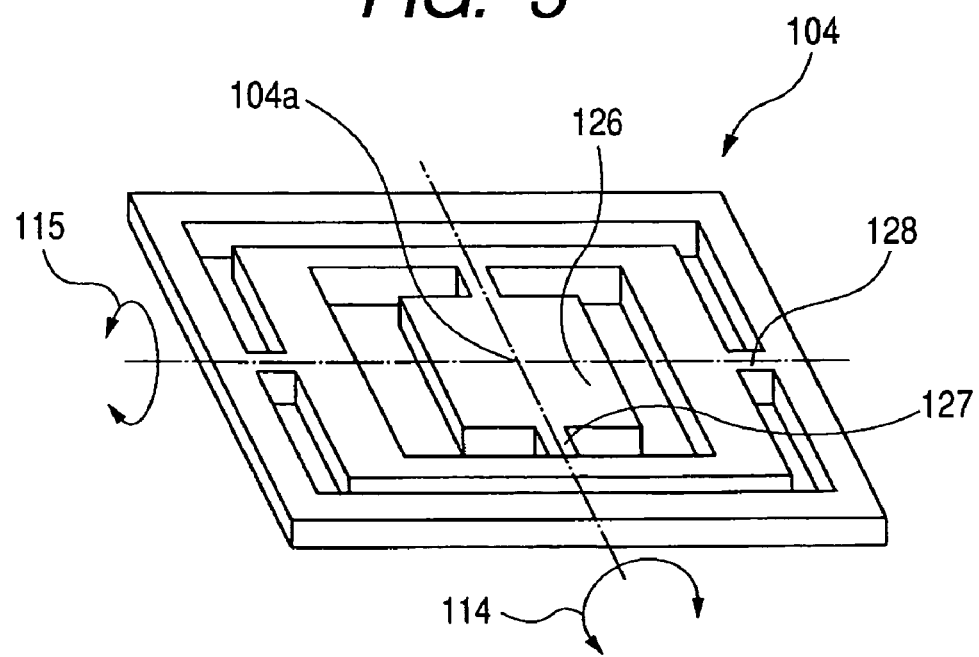
FIG. 3 is a structure diagram of a scanning device according to the first embodiment of the present invention.

Here, the structure and operation of the scanning device 104 is explained with reference to FIG. 3. The scanning device 104 is an MEMS scanning device that is manufactured with a semiconductor process technology. More specifically, a reflective plane 126 is supported by torsion bars 127 and 128, the torsion bar 127 is driven by an actuator (not shown), and the torsion bar 127 is reciprocatingly oscillated in a direction indicated by an arrow 114. In addition, the torsion bar 128 is driven in the same manner, and is reciprocatingly oscillated in a direction indicated by an arrow 115. In this case, the reflective plane 126 is inclined, and thus the light beam incident into the scanning device 104 can be deflected.

The light beam scanned by the scanning device 104 is made incident into a scanning optical system 105, and further into a polarizing plate 114. The directions of polarization of the light beam emitted from the light source 101 are not the same, and accordingly, the light beam that transmits through the polarizing plate 114 is made incident into a polarization beam splitter (optical path splitting means) 106 as a light beam 111d that is linearly polarized.

The polarization beam splitter 106 is provided with an optical surface 106a. The light beam that is selected by the polarizing plate 114 is reflected on the optical surface 106a and is guided onto a reflection-type scanned surface 108. Then, the light beam that is scanned by the scanning device 104 is condensed (formed as an image) onto the scanned surface 108, and a light source image 112 (including 112a, 112b, and 112c) is formed.

Here, a λ/4 phase plate 107 is disposed between the polarization beam splitter 106 and the scanned surface 108, and in addition, a light beam 111d which is linearly polarized and is reflected by the polarization beam splitter 106a transmits through the λ/4 phase plate 107 and condensed onto the scanned surface 108 as a circular-polarized light 111e.

Figure 4:
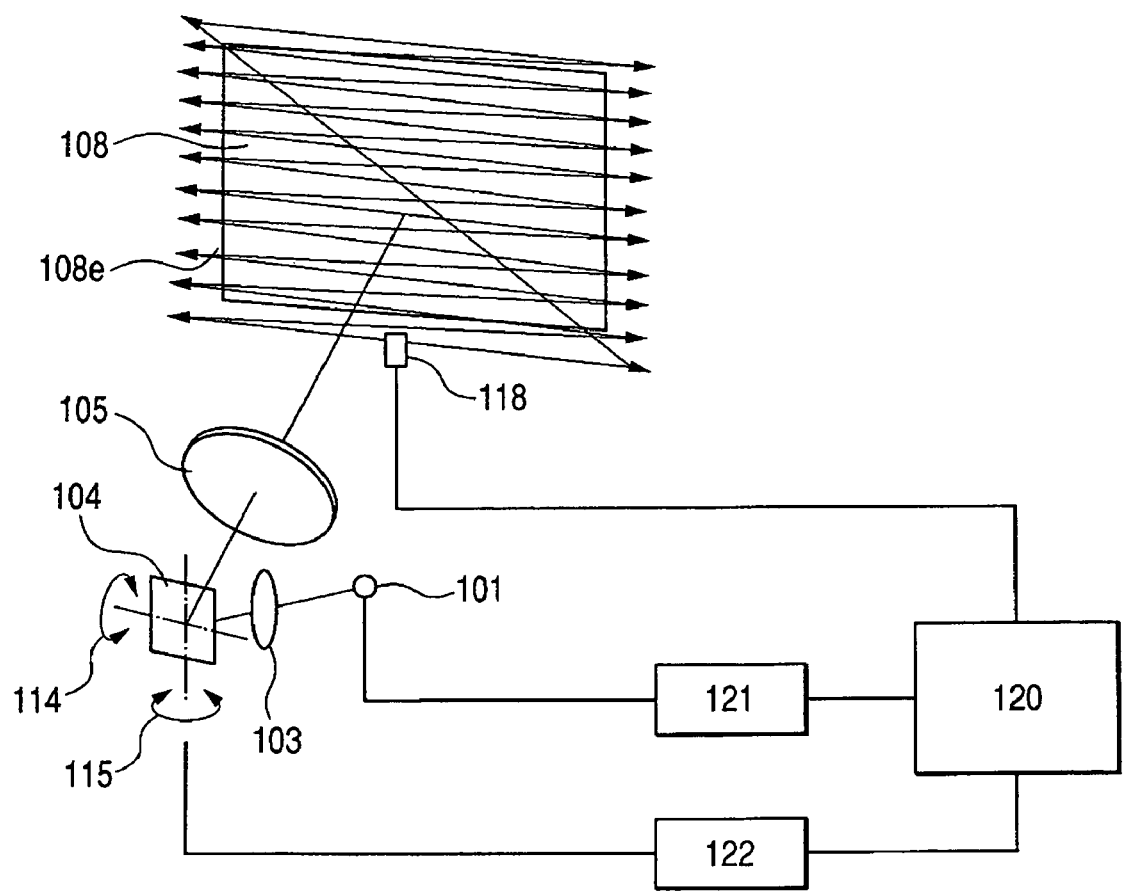
FIG. 4 is a schematic diagram of a structure of the image display apparatus according to the first embodiment of the present invention.

A method of drawing the image according to the image display apparatus of the present invention is, as shown in FIG. 4, such that the light beam incident into the scanning device 104 disposed between the light source optical system 103 and the scanning optical system 105 is subjected to a raster scanning in two directions, namely, the directions indicated by the arrow 114 and the arrow 115, and then the light source image is scanned onto the scanned surface 108. Besides, a light source driving circuit 121 is electrically connected to the light source 101, and a scanning driving circuit 122 is electrically connected to the scanning device 104, and a control circuit 120 controls the light source driving circuit 121 and the scanning driving circuit 122. More specifically, the light source 101 is controlled to be modulated so as to synchronize with a scanning control of the scanning device 104, and thus the image is displayed within an effective area 108e on the scanned surface 108.

Further, a synchronization detection circuit 118 that is provided outside of the effective area 108e on the scanned surface 108 carries out a feedback control by detecting information of the light to be scanned on the scanned surface 108.

In addition, the circular-polarized light 111e that is condensed onto the scanned surface 108 is reflected on the scanned surface 108 because the scanned surface 108 is a reflection-type scanned surface, and the circular-polarized light 111e again transmits through the λ/4 phase plate 107. Here, the circular-polarized light is made incident into the polarization beam splitter 106 as a linear-polarized light beam 111f having a polarization direction perpendicular to an advancing direction of an incident light (refer to FIG. 2).

The optical surface 106a of the polarization beam splitter 106 serves as a transmission plane with respect to the linear-polarized light beam 111f, and the transmitted light beam 111f travels toward an eye-piece optical system 109. The eye-piece optical system 109 is configured so that pupils of the observer and exit pupils are substantially matched in order for the observer to observe the image formed onto the scanned surface 108 as the virtual image at a pupil 110.

Figure 2:
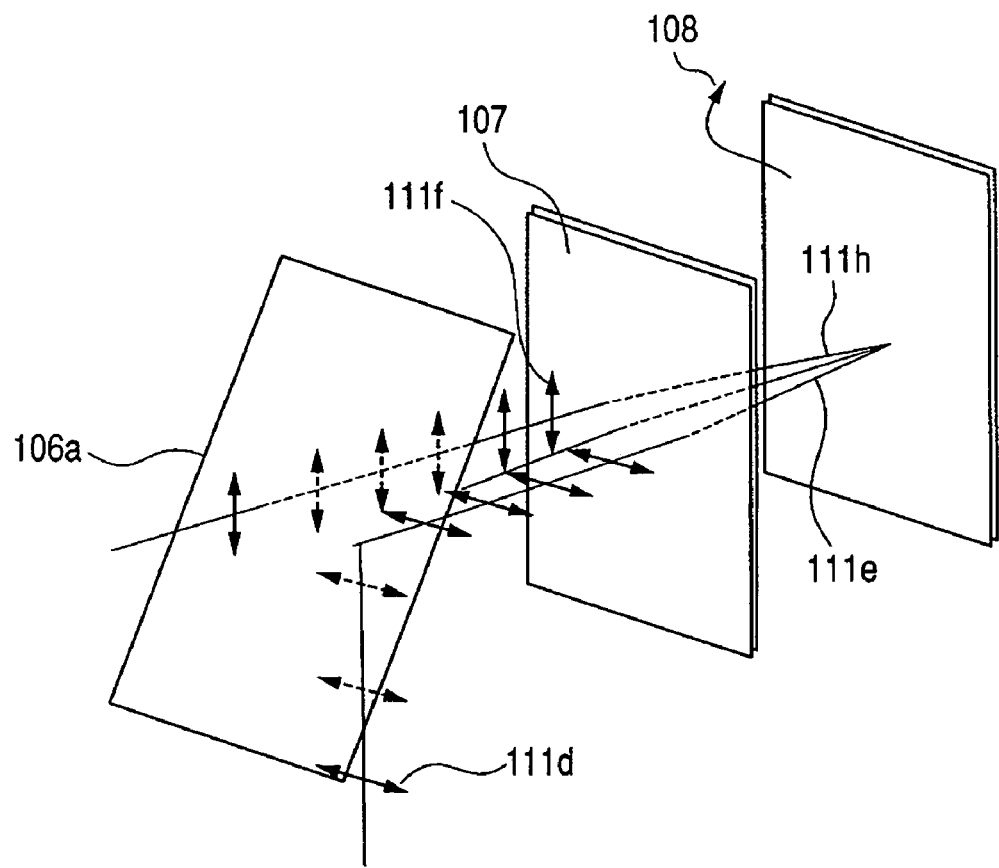
FIG. 2 is an explanatory view of an optical surface (optical path splitting means) according to the first embodiment of the present invention.

Next, a detailed explanation is made as to the polarization beam splitter 106 that is the optical path splitting means according to this embodiment, with reference to FIG. 2. In FIG. 2, the light beam that is emitted from the light source 101 and made incident into the scanning device 104 is scanned by the scanning device 104, and then is made incident into the polarization beam splitter 106 as an incident light beam 111d via the polarizing plate 114. Here, the incident light beam 111d is an s-polarized component.

On the other hand, the optical surface 106a of the polarization beam splitter 106 is a polarization splitter surface on which a dielectric material is vapor deposited. The optical surface 106a reflects only the s-polarized component and transmits a p-polarized component therethrough. Thus, the incident light beam 111d is reflected on the optical surface 106a and is guided to the λ/4 phase plate 107.

The light beam that transmits through the λ/4 phase plate 107 becomes the circular-polarized light beam 11e and is reflected on the scanned surface 108. The reflected light beam becomes a circular-polarized light 111h that travels in a direction opposite to a direction in which the circular-polarized light beam 111e travels. The circular-polarized light beam 111h again transmits through the λ/4 phase plate 107 and is polarized by the linear-polarized light beam 111f. The linear-polarized light beam 111f is a p-polarized component, and accordingly, transmits through the optical surface 106a, and is then emitted from the polarization beam splitter 106.

Thus, in this embodiment, the optical surface 106a that is common to a first optical path through which the light beam reflected on the scanned surface 108 and a second optical path through which the light beam travels from the scanning device 104 to the scanned surface 108 is provided. The light beam emitted from the light source and the light beam that is reflected on the scanned surface 108 transmit through or are reflected on the polarization beam splitter 106, and thus the first optical path and the second optical path are split from each other.

Accordingly, it is possible to dispose the optical path of the light beam that travels toward the scanned surface 108 by means of the optical surface 106a of the polarization beam splitter 106 and the optical path of the light beam that is reflected on the scanned surface and travels in a direction of the pupils of the observer in an effectively folding manner. In other words, the first optical path and the second optical path can be disposed in an overlapped manner.

As a result, it is possible to downsize the whole image display apparatus with a simple and compact structure while the length of the optical paths of the whole optical system is preferably secured.

In addition, the phase plate that perpendicularly or substantially perpendicularly changes a polarization state is disposed in the optical path that is common to the first optical path and the second optical path, and the first optical path and the second optical path are split from each other by allowing the light beam to be reflected and transmitted in accordance with the polarization direction of the light beam incident on the optical surface 106a, and thus a loss in light amount can be reduced.

Figure 5:
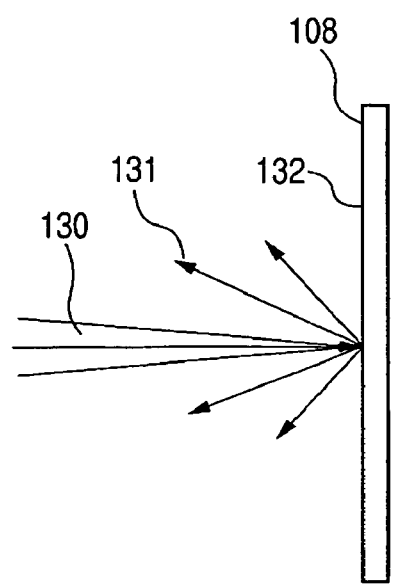
FIG. 5 is an explanatory view of a scanned surface according to the first embodiment of the present invention.

Note that an optical element 132 having an optical diffusion action such as a microlens array may be provided on the scanned surface 108, as shown in FIG. 5. The optical element 132 causes an incident light beam 130 to be optically diffused and thus numerical aperture (NA) of the incident light beam 130 and the NA of an emission light beam 131 are changed, and thus it is possible to enlarge an observation pupil diameter of the observer. Further, by providing a structural member having periodicity such as the microlens array or a diffractive optical element on the scanned surface 108, it is possible to readily carry out a control of the optical diffusion action.

Besides, in this embodiment, for the scanning device 104, the explanation is made as to the two-dimensional scanning means that utilizes the MEMS technology as one example, however, the scanning device 104 may be configured with a combination of two one-dimensional scanning devices, for example.

In addition, in this embodiment, only one light source is shown, however, for the light source, a light source that emits light beam of red, green, and blue independently (namely, the light source such as an LED) may be used, as well as a single-color light source. In this case, by combining the light beams emitted from each light source into one single light beam via the color combining optical system (dichroic prism and the like) 102 and making the combined light beam incident into the scanning device 104, and also by modulating the light source of each of the colors in accordance with the image signal, it is possible to provide the observer with a color image. Further, the light source that emits the non-polarized light beam is explained as one example of the light source, however, in this regard, in the case where a semiconductor laser is used as the light source, a device for properly adjusting the polarization direction of the light beams in relation to the optical path splitting means and a device for rotating the polarization of the light beams may be disposed thereto.

In addition, in this embodiment, as a method of modulating the image signal, the modulation of the intensity of the light source is mentioned, however, a method using a pulse width modulation (PWM) of the light source and a method using an external modulation device may of course be used.

Second Embodiment

Figure 6:
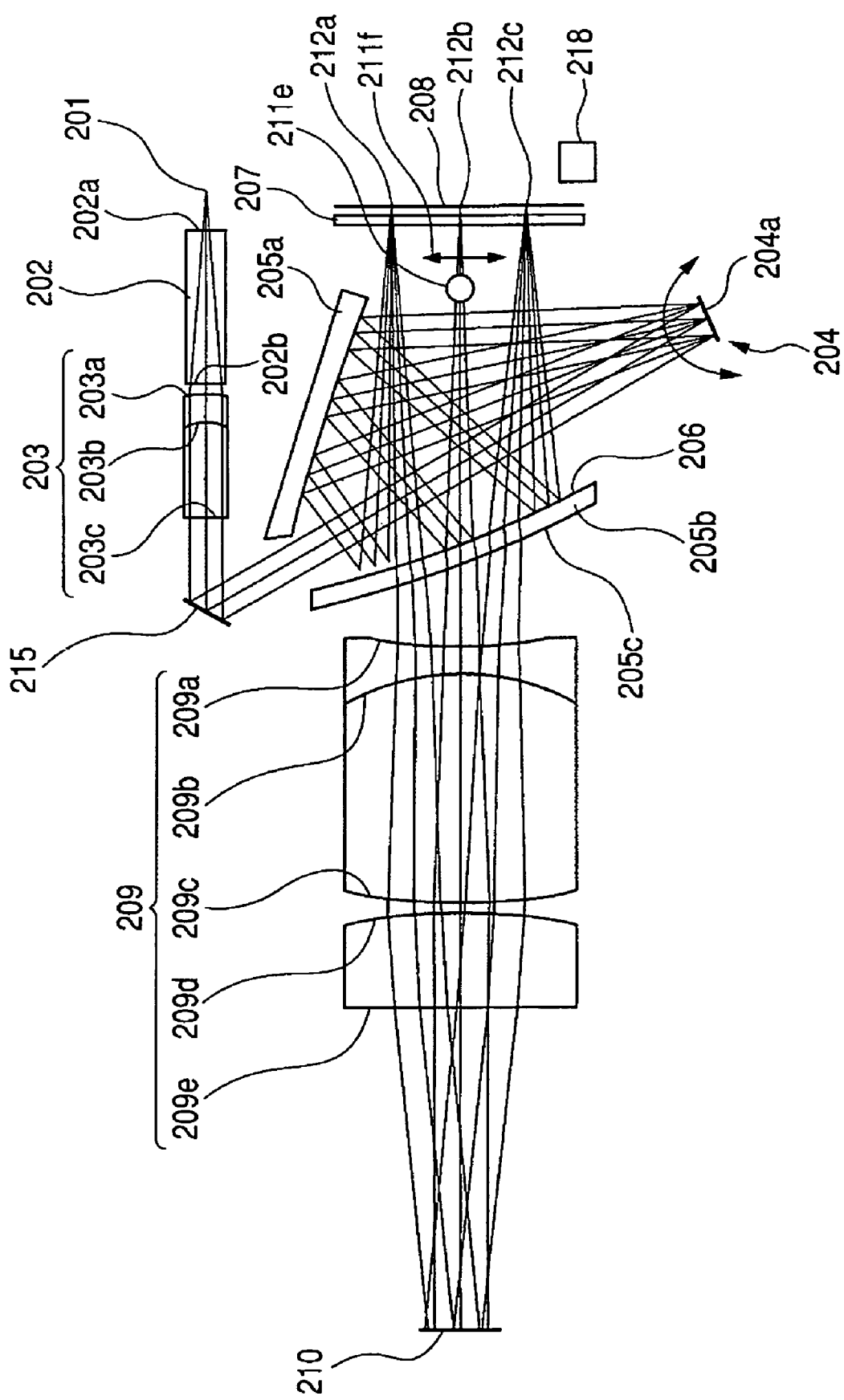
FIG. 6 is a schematic diagram of a structure of a scanning type displaying optical system of an image display apparatus according to a second embodiment of the present invention.

FIG. 6 is a schematic diagram of a structure of a scanning type displaying optical system of the image display apparatus according to a second embodiment of the present invention. The light beam emitted from a light source 201 of the scanning type displaying optical system of this embodiment is made incident onto a deflecting mirror 215 via a color combining optical system 202 and a light source optical system 203. The light beam reflected on the deflecting mirror 215 is incident into a scanning device 204. Note that the scanning device 204 is a scanning element that is manufactured by using the MEMS technology, just like the scanning element as shown in FIG. 3 of the first embodiment, and the scanning device 204 polarizes (reflects) the light beam incident at a deflection point 204*a*.

Further, the light source 201 of this embodiment is a light source that emits the non-polarized light beam such as a surface light-emitting type light emitting diode, as in the case of the first embodiment. The directions of polarization of the light beam emitted from the light source 201 are not the same, and accordingly, for the deflecting mirror 215, a reflection-type polarizing plate that reflects the light beam only in a specific polarization direction is employed. Thus, only the light beam polarized in a specific polarization direction is incident into a scanning optical system 205, which is to be described later.

Besides, the light beam scanned by the scanning device 204 is made incident into the scanning optical system 205 configured by free-form curved surface mirrors 205*a* and 205*b* that are rotationally asymmetry free-form curved surfaces.

The free-form curved surface mirrors 205*b* serves as the optical path splitting means. An optical surface (reflection plane and transmission plane) 206 of the free-form curved surface mirror 205*b* is equivalent to the optical surface 106*a* of the first embodiment.

Thus, the light beam having the specific polarization direction that is selected by the deflecting mirror 215 is reflected on the free-form curved surface mirror 205*a* to travel to the free-form curved surface mirror 205*b*, and then reflected by the free-form curved surface mirror 205*b* onto a scanned surface 208. Thus, the light beam emitted from the light source 201 is condensed on the scanned surface 208, and thus a light source image 212 is formed. The light source images resulting from the scanning by the scanning device 204 around the deflection point 204*a* are, for example, a light source image 212*a*, a light source image 212*b*, and a light source image 212*c*.

Besides, a $\lambda/4$ phase plate 207 is disposed between the optical surface 206 of the free-form curved surface mirror 205*b* that is the optical path splitting means and the scanned surface 208. A light beam 211*e* that is linearly-polarized and reflected on the optical surface 206 of the free-form curved surface mirror 205*b* transmits through the $\lambda/4$ phase plate 207, and then the light beam 211*e* becomes the circular-polarized light beam and is condensed onto the scanned surface 208. The scanned surface 208 is a reflection-type scanned surface as in the case of the first embodiment, and accordingly, the light beam reflected on the scanned surface 208 again transmits through the $\lambda/4$ phase plate 207 and becomes a linear-polarized light beam, and then becomes a linear-polarized light beam 211*f* having a polarization direction perpendicular to an advancing direction of a light beam incident onto the scanned surface 208.

The linear-polarized light beam 211*f* is made incident onto the optical surface 206 of the free-form curved surface mirror 205*b*. The optical surface 206 serves as a polarization beam splitter plane, and acts as a transmission plane in relation to the linear-polarized light beams 211*f*. Thus, the light beam that transmits through the optical surface 206 transmits through a back surface 205*c* of the free-form curved surface mirror 205*b*. Then, the observer can observe the image formed on the scanned surface 208 as the virtual image via an eye-piece optical system 209 at a pupil 210.

Figure 7:
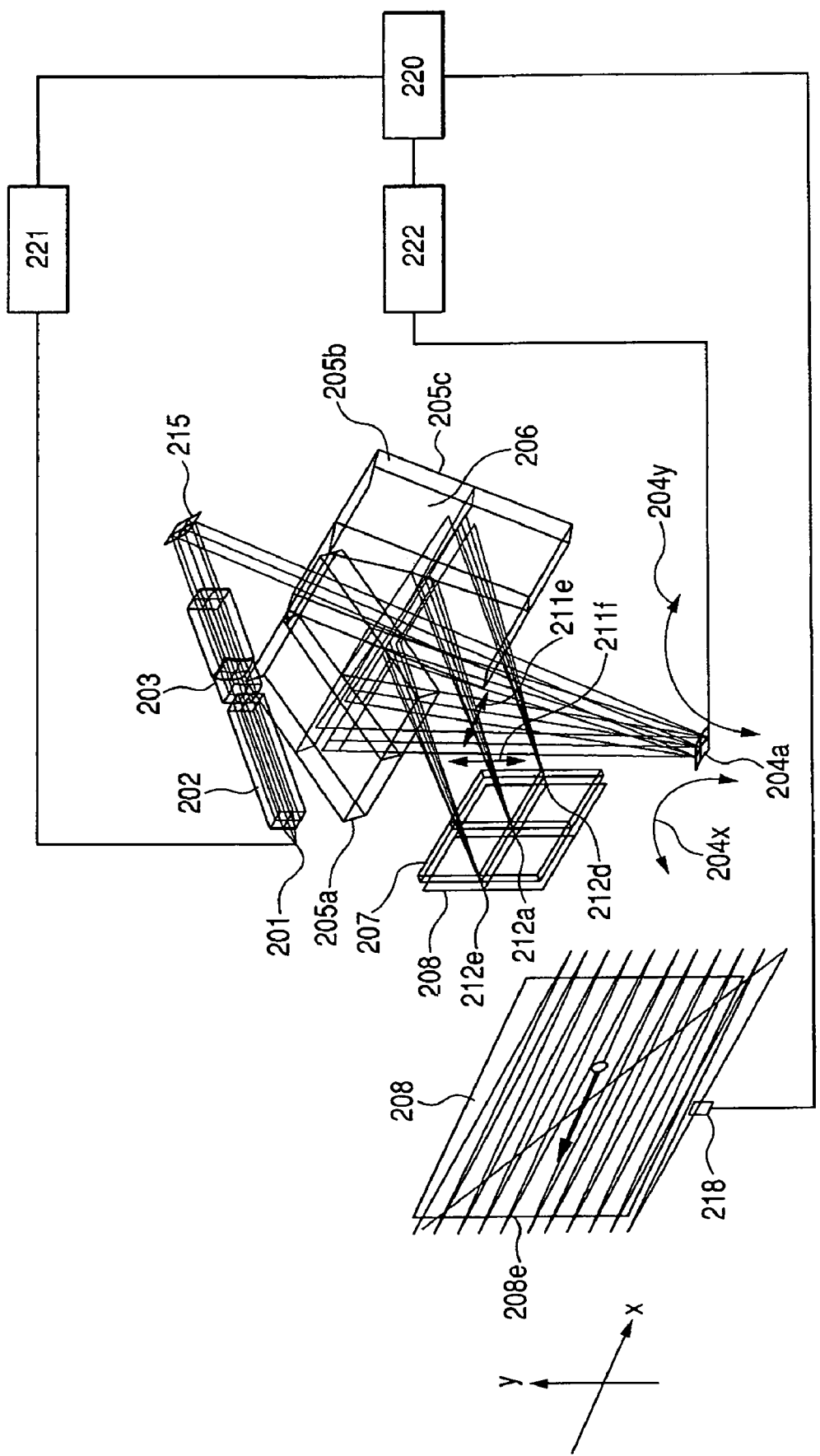
FIG. 7 is a schematic diagram of a structure of the image display apparatus according to the second embodiment of the present invention.

Next, image forming carried out by the image display apparatus according to this embodiment is explained. FIG. 7 is a view showing an outline of essential portion of the scanning type displaying optical system of this embodiment. The light beam emitted from the light source 201 reaches the scanned surface 208, as shown in FIG. 6. When the scanning device 204 scans with the light beam from the light source 201 by carrying out resonance action in a direction indicated by an arrow 204*x*, the light source image 212 that is formed on the scanned surface 208 as a light source image 212*a*, a light source image 212*e*, and a light source image 212*d* by scanning. The scanning device 204 according to this embodiment performs a resonant oscillation operation with respect to the scanning in an x direction of FIG. 7, and scans in a saw-tooth wave-like manner in a y direction in FIG. 7. That is, the light source image 212 is subjected to raster scanning on the scanned surface 208 to be formed thereon.

Besides, a light source driving circuit 221 is electrically connected to the light source 201, and a scanning driving circuit 222 is electrically connected to the scanning device 204, and a control circuit 220 controls the light source driving circuit 221 and the scanning driving circuit 222. More specifically, the light source 201 is controlled to be modulated so as to synchronize with a scanning control of the scanning device 204, and thus a desired image (video) is displayed within an effective area 208*e* on the scanned surface 208.

Further, in a region outside an effective area 208*e* on the scanned surface 208, a synchronization detection circuit 218 is provided. The synchronization detection circuit 218 carries out a feedback control by detecting information of a light to be scanned on the scanned surface 208. It is preferable that the synchronization detection circuit 218 is disposed at the back of the reflection-type scanned surface 208. By thus disposing the synchronization detection circuit 218, it is possible to eliminate the need for a separate optical system for detecting synchronization and to reduce overlapping with the light beam to the effective area 208e.

Thus, in this embodiment, the scanning optical system includes the free-form curved surface mirrors 205a and 206b, and the optical surface 206 of the free-form curved surface mirror 205b is the polarization beam splitter plane.

That is, the optical surface 206 that serves as the polarization beam splitter plane is provided to the free-form curved surface mirror 205b that is common to the first optical path for observation of the reflection-type scanned surface 208 by the observer and the second optical path from the scanning device 204 to the scanned surface 208. The optical surface 206 separates the first optical path and the second optical path, and allows the first and the second optical paths to be overlapped with each other.

Thus, the optical path can be bent in relation to the scanned surface 208. That is, it is possible to achieve a compact construction of the whole scanning type displaying optical system while suitably maintaining the length of the optical paths.

Note that in this embodiment, for the optical path splitting means, the explanation is made as to the free-form curved surface mirror 205b that is provided with the optical surface 206 having the polarization beam splitter function as one example, however, the optical path splitting means may be a half mirror. In the case where the half mirror is used as the optical path splitting means, a quantity of light loss increases to some degree, however, the scanning type displaying optical system can be downsized, just as in this embodiment.

In addition, when the optical surface 206 that has the polarization beam splitter function is employed as the optical path splitting means as in this embodiment, an external light that is incident from the observer side does not directly return to the observer from the reflection-type scanned surface 208, and accordingly, the observer can observe a high-quality image.

Note that it is preferable to allow the rear surface 205c of the free-form curved surface mirror 205b of this embodiment to have a freely curved form so that an aberration arising when the light beam transmits through the optical surface 206 can be corrected. Besides, a function for correcting the aberration may be provided to other optical surfaces or an optical member disposed on the optical path on the first optical path including the eye-piece optical system 209 extending from the optical surface 206 to the pupil of the observer. This applies to other embodiments of the present invention.

Further, in this embodiment, an example of the surface light emitting-type light emitting diode is described as the light source 201, however, the semiconductor laser, just as in the first embodiment, and a light emitting diode that emits a polarized light beam may be used. More specifically, although the light source 201 of FIGS. 6 and 7 includes one light emitting point, it is possible to display a full-color image by combining the light beam emitted from a light source that emits light beams of red, green, and blue via a color combining optical system 202. Hereinbelow, another form of the light source 201 is described.

Figure 8:
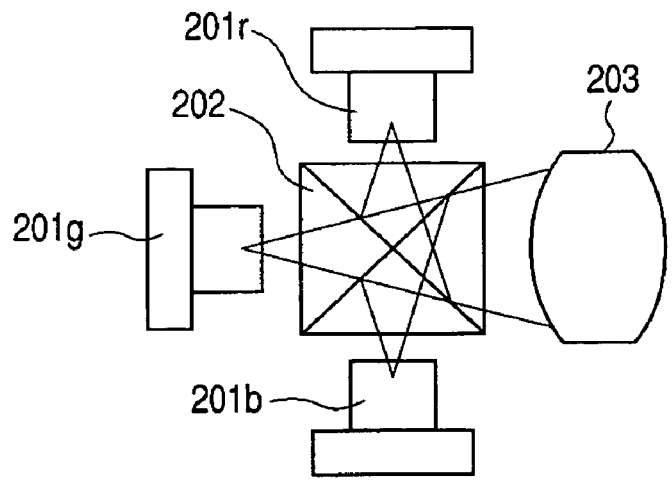
FIG. 8 is a view showing another form of a light source optical system and a color combining optical system according to the second embodiment of the present invention.

FIGS. 8, 9, 10, 11A, and 11B are views showing another form of a peripheral portion of the light source 201, respectively. In FIG. 8, the light sources 201r, 201g, and 201b respectively denote a red, green, and blue light emitting diode. The color combining optical system 202 is a dichroic prism.

The light beam emitted from a light emitting point of each light emitting diode is combined by the color combining optical system 202, and is emitted from the light source optical system 203 as the light beam that is turned into a substantially parallel light beam. The color-combined light beam is scanned onto the scanned surface 208, and thus a full-color image can be displayed.

Figure 9:
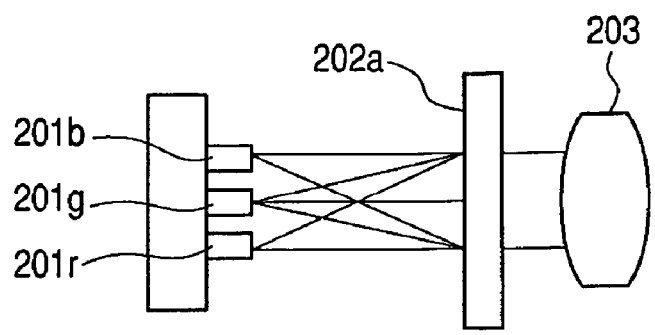
FIG. 9 is a view showing still another form of a light source optical system and a color combining optical system according to the second embodiment of the present invention.

FIG. 9 shows a form of this embodiment in which the color combining optical system 202 employs a diffractive optical element 202a, instead of the dichroic prism. In this case, a pitch and a shape of the diffractive optical element 202a are determined so that the light source optical system 203 causes the light beams from each light source to be one single light beam.

Figure 10:
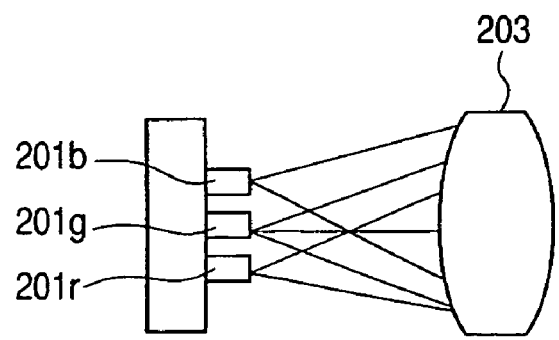
FIG. 10 is a view showing still another form of a light source optical system and a color combining optical system according to the second embodiment of the present invention.

FIG. 10 shows a form of light sources in which each of the light source 201r, 201g, and 201b, which respectively correspond to red, green, and blue, are separately disposed. The direction of light emitted from the light source optical system 203 is different with respect to each color. Therefore, light source images of each of the colors are formed at mutually different positions on the scanned surface 208. Thus, a high quality image can be displayed by controlling the emission of light of each color in accordance with the distance between the light source images.

Figure 11A:
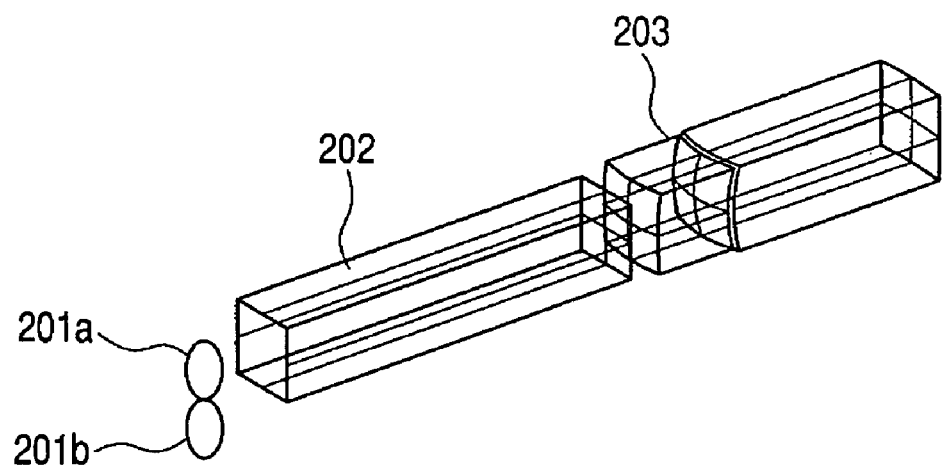

Besides, FIG. 7 shows a case where the image is displayed by the scanning performed by the scanning device 204 so that the light beams from the light source 201 form one single light source image on the scanned surface 208, and FIG. 11A shows a case where the light source 201 includes the light sources 201a and 201b. By using two light sources like this, scanning can be independently and separately performed with the light beams emitted from each light source (see FIG. 11B) and each of the light sources can be independently controlled.

Figure 11B:
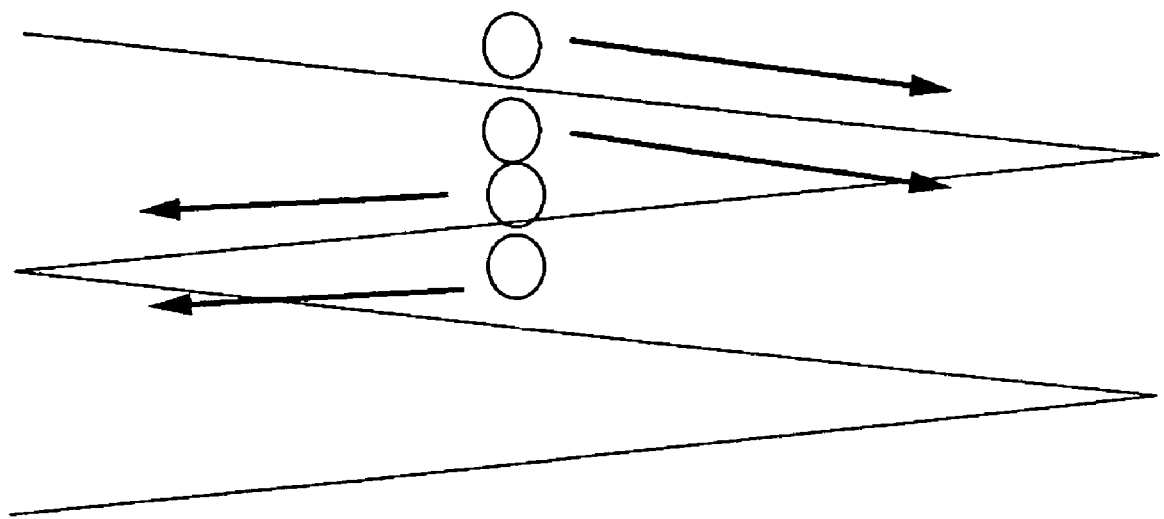

Note that FIGS. 8 through 10 show the cases where the colors of the light emitting diodes are different from one another, and FIGS. 11A and 11B show the cases where the optical system is a so-called multi-beam optical system in which a plurality of light sources of the same color is disposed.

Third Embodiment

Figure 12:
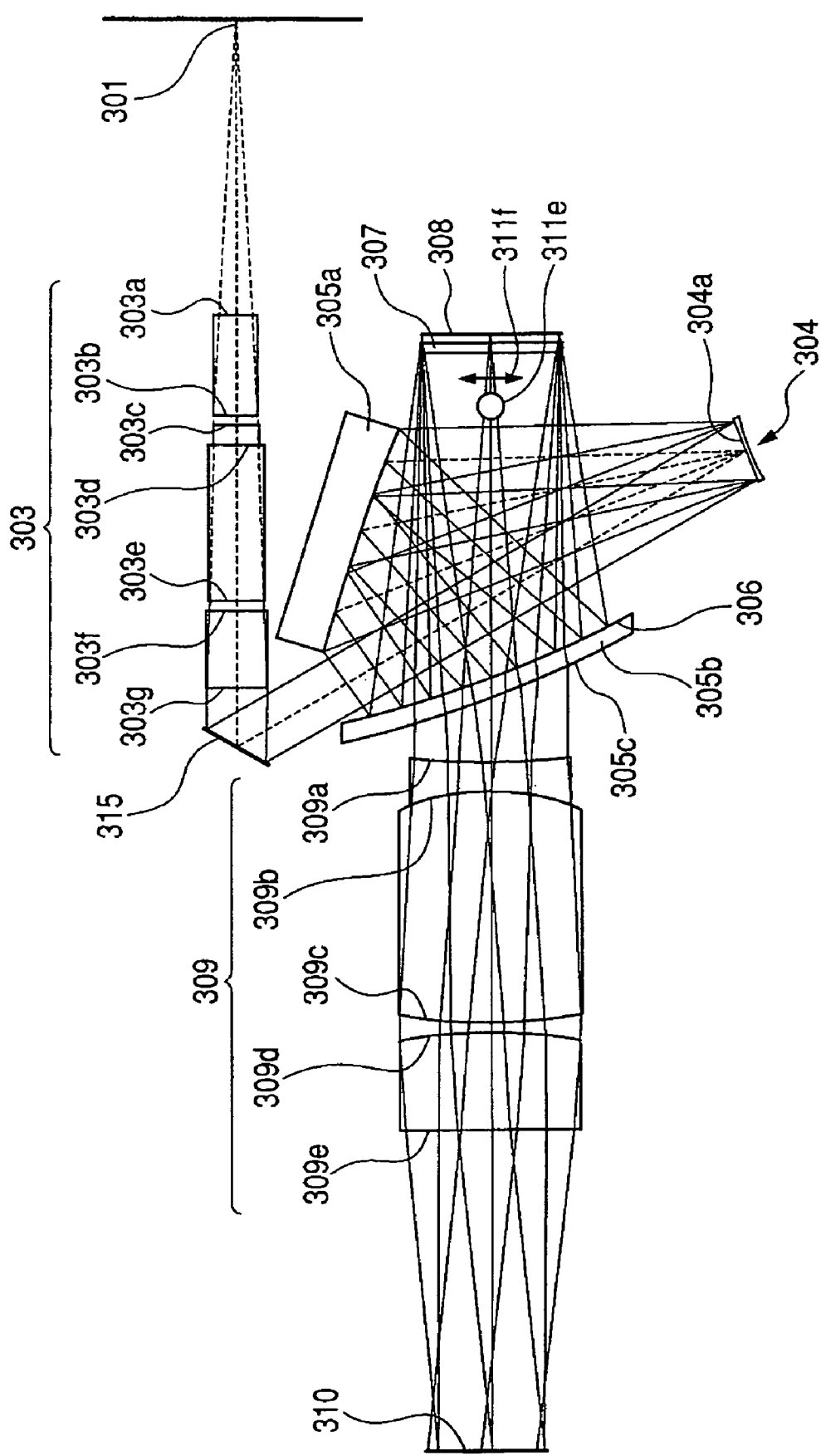
FIG. 12 is a schematic diagram of a scanning type displaying optical system of an image display apparatus according to a third embodiment of the present invention.

FIG. 12 is a schematic diagram of a structure of a scanning type displaying optical system of the image display apparatus of a third embodiment. The light beam emitted from a light source 301 of the scanning type displaying optical system of this embodiment reaches a deflecting mirror 315 via a light source optical system 303, and the light beam reflected on the deflecting mirror 315 is incident into a scanning device 304. Note that the scanning device 304 is a scanning element that is manufactured by using the MEMS technology, just like the scanning element as in the case of the first embodiment, and the scanning device 304a deflects the light beam incident at a deflection point 304a.

A light source 301 is the light source that emits non-polarized light beams of the surface light-emitting type light emitting diode. The light source 301 is the light source in which light emitting elements are one-dimensionally arranged. The light beams emitted from the light source 301 are emitted in mutually different polarization directions. Accordingly, a deflecting mirror 315 is a reflection-type polarizing plate that reflects the light beam in a specific polarization direction, and the light beam in the specific polarization direction is incident into free-form curved surface mirrors 305a and 305b.

Besides, the light beam deflected by a scanning device 304 is incident into the scanning optical system 205 that is structured by the free-form curved surface mirror 305a and 305b having a rotationally asymmetrical free-form curved surface.

The free-form curved surface mirror 305b serves as the optical path splitting means, and the optical surface (reflection plane and transmission plane) 206 of the free-form curved surface mirror 305b is equivalent to the optical surface 106a of the first embodiment.

Accordingly, with respect to the light beams from the light source 301, only the light beam in the specific polarization direction is selected by the deflecting mirror 315 from among the light beams from the light source 301, and the selected light beam is made incident into the scanning device 304. The light beam incident into the scanning device 304 is reflected by the free-form curved surface mirror 305a, and further, is reflected by an optical surface 306 of the free-form curved surface mirror 305b, then is guided to a scanned surface 308 to be condensed onto the scanned surface 308, and thus a light source image 312 is formed onto the scanned surface 308.

Besides, a λ/4 phase plate 307 is disposed between the optical surface 306 of the free-form curved surface mirror 305b that is the optical path splitting means and the scanned surface 308 (in FIG. 12, a front surface of the scanned surface 308). A linear-polarized light beam 311e that is reflected on the optical surface 306 transmits through the λ/4 phase plate 307, and then the light beam 311e becomes the circular-polarized light beam and reaches the scanned surface 308. The scanned surface 308 applies a reflection-type scanned surface as in the case of the first embodiment, and accordingly, the light beam condensed onto the scanned surface 308 is reflected, and again transmits through the λ/4 phase plate 307. The circular-polarized light beam becomes a linear-polarized light beam 311f having a polarization direction perpendicular to the direction of the light beam 311e that is incident onto the scanned surface 308, by transmitting through the λ/4 phase plate 307.

The linear-polarized light beam 311f that transmits through the λ/4 phase plate 307 is made incident onto the optical surface 306 of the free-form curved surface mirror 305b. The optical surface 306 serves as a polarization beam splitter plane, and acts as a transmission plane for the linear-polarized light beam 311f. Thus, the light beam that is reflected on the scanned surface 308 and is incident onto the optical surface 306 transmits through a back surface 305c of the free-form curved surface mirror 305b. Then, the observer can observe the image formed on the scanned surface 308 as the virtual image via an eye-piece optical system 309 at a pupil 310.

Figure 13:
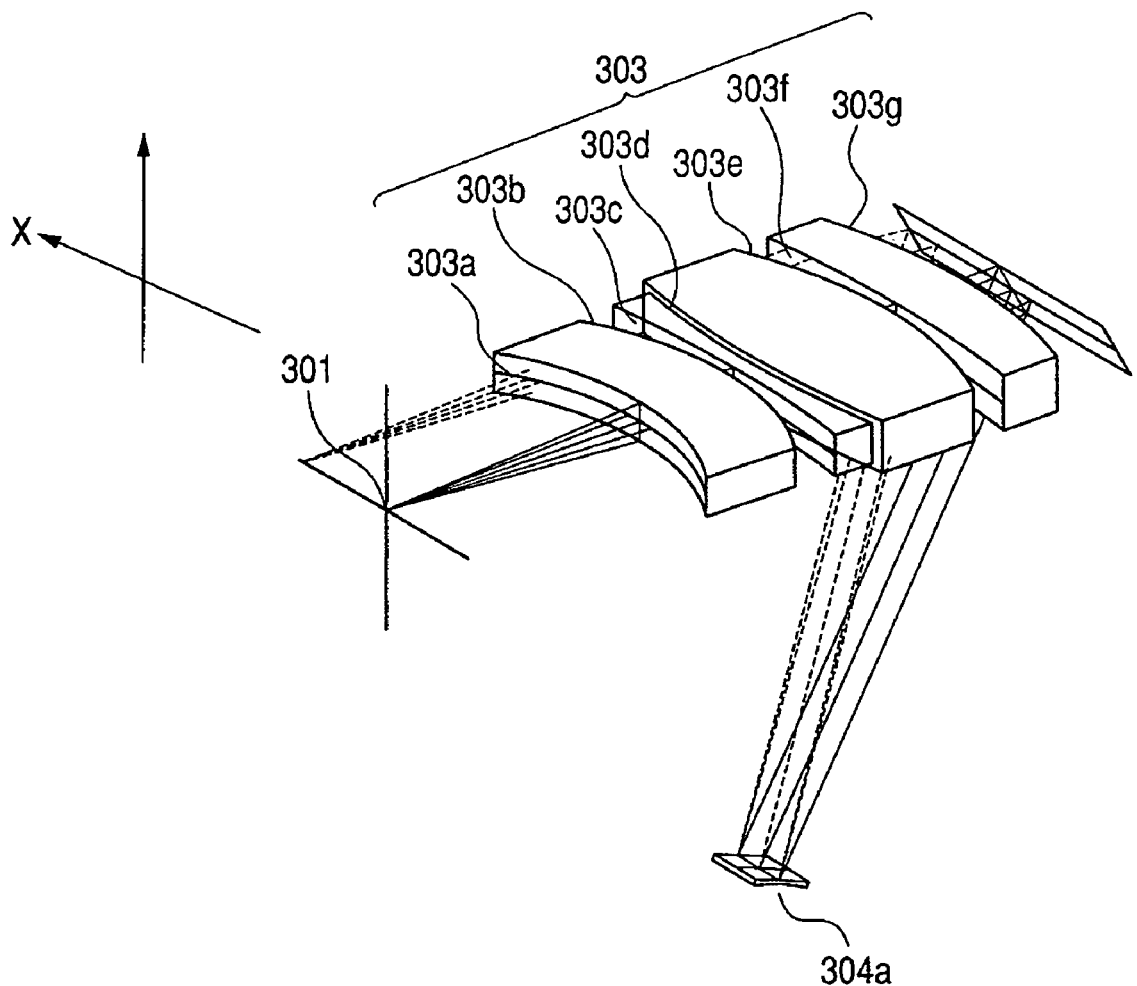
FIG. 13 is a structure diagram of a light source optical system according to the third embodiment of the present invention.

Here, the light source 301 and a light source optical system 303 according to this embodiment are explained. The light source 301 according to this embodiment is an array light source in which light emitting points are one-dimensionally arranged. The scanning device 304 is a one-dimensional scanning device. FIG. 13 is a block diagram of the light source optical system 303 of this embodiment.

The light source 301 is a one-dimensional array light source having the emitting points that are mutually independently driven in an x direction of FIG. 13. The light beam emitted from each of the light sources transmits through the light source optical system 303 having optical surfaces 303a, 303b, 303c, 303d, 303e, 303f, and 303g. Then, the light beam is reflected by the deflecting mirror 315 that reflects only a specific polarization component, and the reflected light beam is then guided to the scanning device 304. Then, principal rays 327 from each emitting point are condensed into a spot on the scanning device 304. Note that only two light beams are shown in FIG. 13, however, in actuality, there are as many light beams as the light emitting points that are independently driven.

Figure 14:
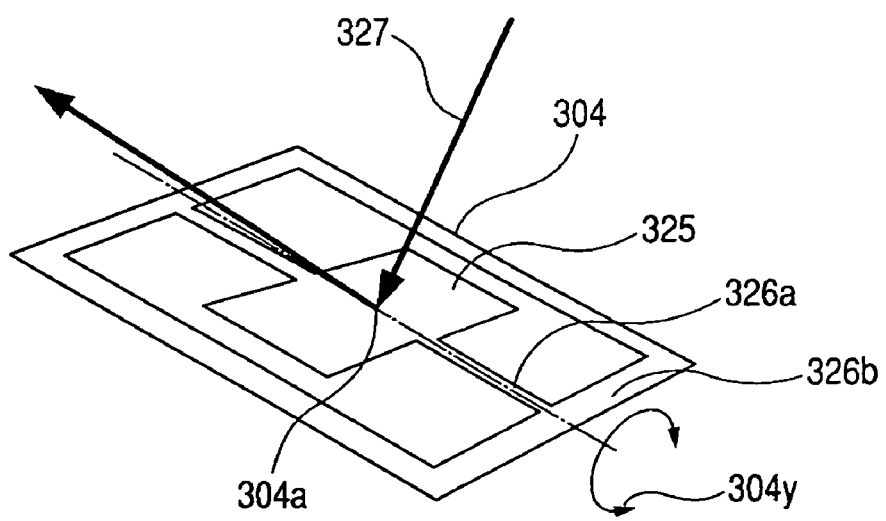
FIG. 14 is a structure diagram of a scanning device according to the third embodiment of the present invention.

FIG. 14 is a structure diagram of the scanning device 304 according to this embodiment. A deflecting surface 325 is a reflection plane that is subjected to a processing for reflecting the incident light. The deflecting surface 325 is supported by a torsion bar 326a and a supporting plate 326b. The deflecting surface 325 is reciprocatingly oscillated in a direction 304y by an actuator (not shown), and thus the scanning device 304 is deflected to deflect the incident light for scanning.

Figure 15:
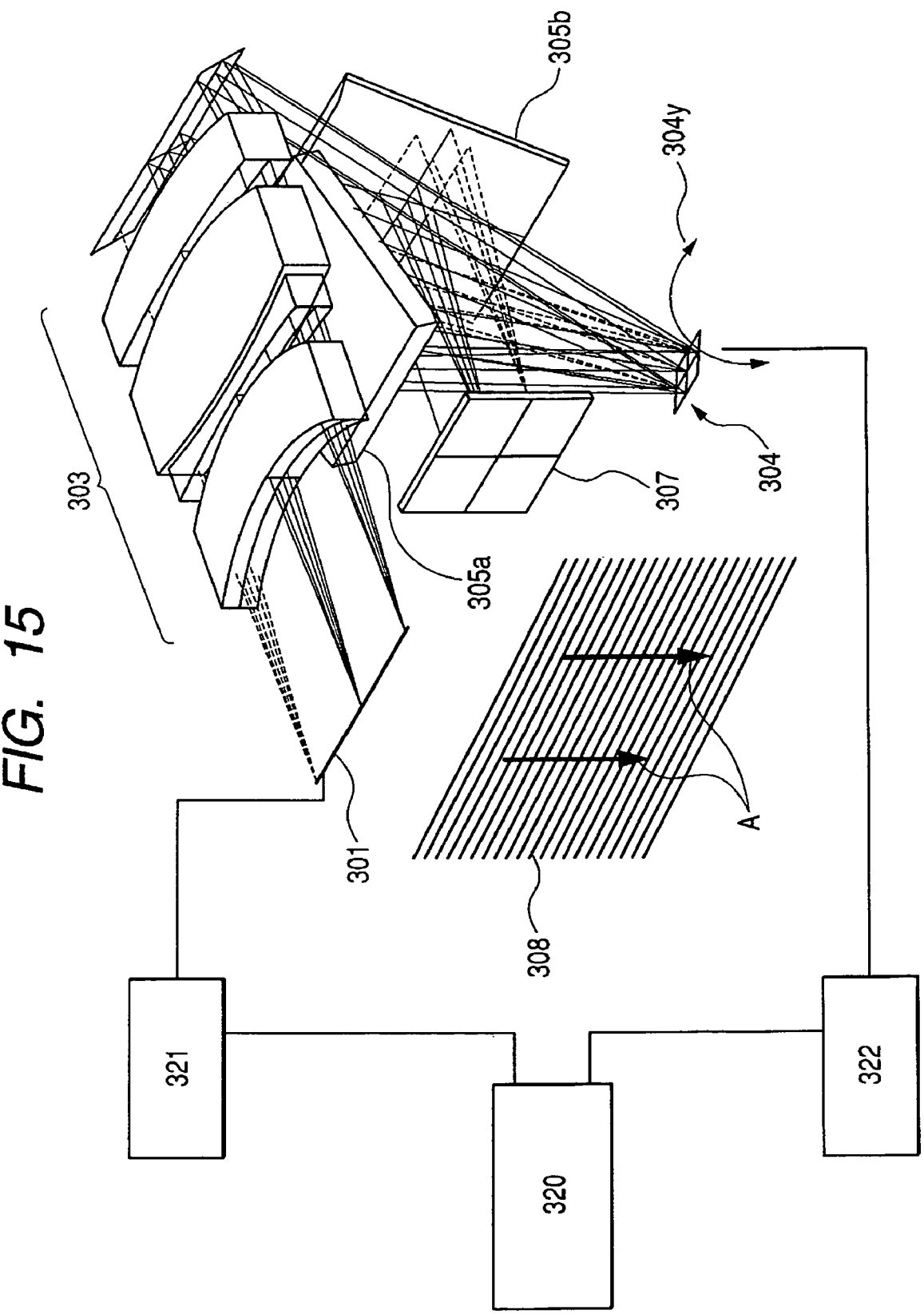
FIG. 15 is a schematic diagram of a structure of the image display apparatus according to the third embodiment of the present invention.

Next, an image forming operation according to the image display apparatus of this embodiment is explained. FIG. 15 is a view showing an outline of an essential portion of the scanning type displaying optical system according to this embodiment.

The optical path is adjusted so that the light beams emitted from the light source 301 transmits through the light source optical system 303 and then the principal rays 327 are condensed into a spot on the scanning device 304. A light source image corresponding to each of the light emitting points is formed onto the scanned surface 308 by a scanning optical system 305 constructed by the free-form curved surface mirrors 305a and 305b that do not have a rotationally symmetrical axis, by using the light beam reflected by the scanning device 304. The scanning device 304 scans the light source image in a direction perpendicular to a direction of an array of the light source images (in a direction indicated by an arrow A in FIG. 15).

Besides, a light source driving circuit 321 is electrically connected to the light source 301, and a scanning driving circuit 322 is electrically connected to the scanning device 304, and a control circuit 320 controls the light source driving circuit 321 and the scanning driving circuit 322. More specifically, the light source 301 is controlled to be modulated so as to synchronize with a scanning control of the scanning device 304, and thus a desired image (video) is displayed within an effective area on the scanned surface 308.

Further, a feedback control may be carried out by providing a synchronization detecting device in a region outside the effective area on the scanned surface 308 and detecting information of the light beam to be scanned on the scanned surface 308.

Figure 16A:
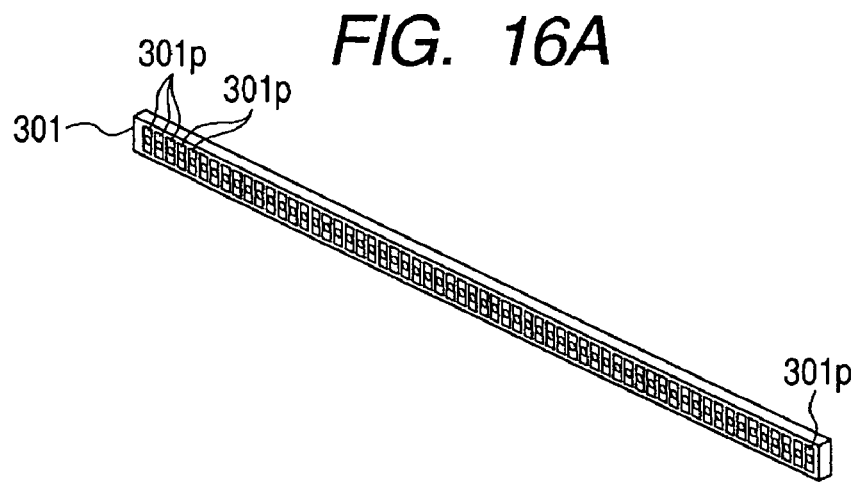
FIGS. 16A, 16B, and 16C are views showing a form of the light source optical system according to the third embodiment of the present invention.

FIG. 16A shows an outline of the light source 301 that is the array light source according to this embodiment. A plurality of light emitting points 301p are formed onto the light source 301, and each of the light emitting points is independently controlled. In this embodiment, the light source 301 is a one-dimensional array light source having a number of light emitting points corresponding to the number of pixels in a horizontal direction. A two-dimensional image is displayed by scanning with the light beam by the scanning device 304 in a direction perpendicular to a direction of the array of the light sources.

Figure 16B:
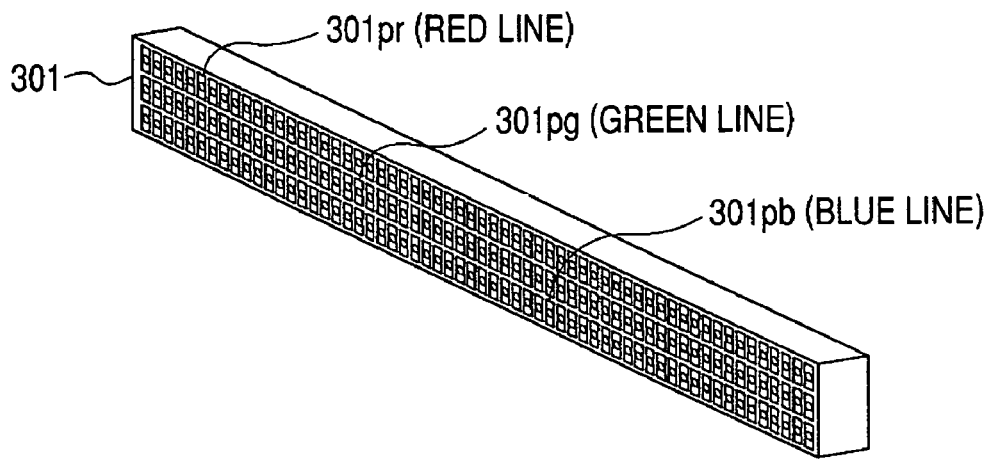
Figure 16C:
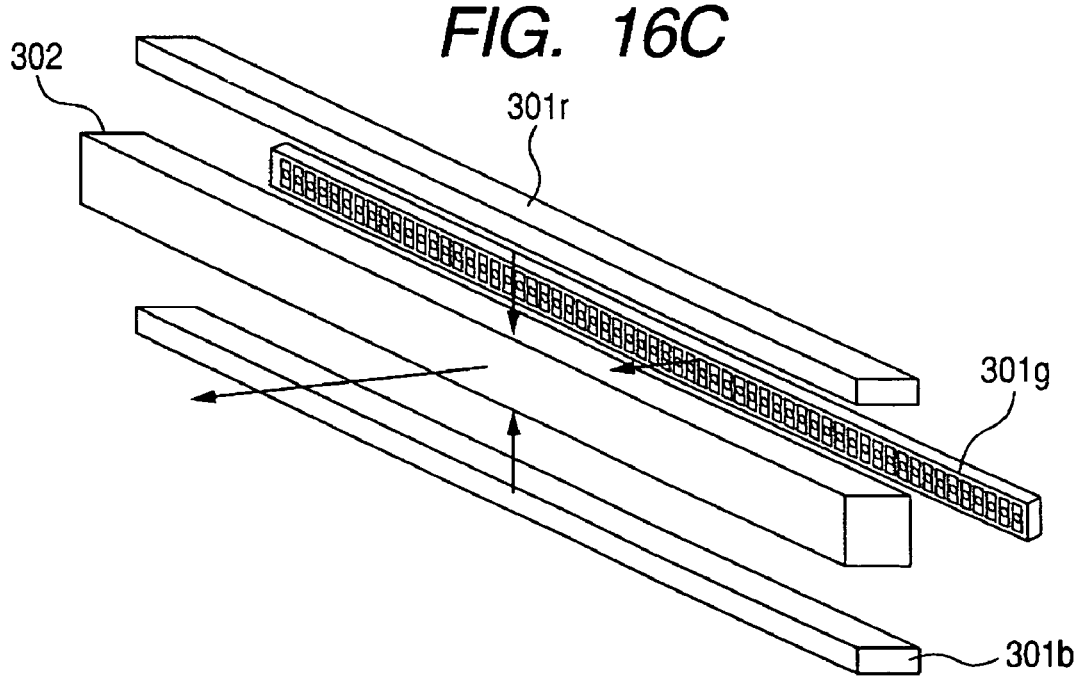

FIG. 16B shows an example in which light sources 301pr, 301pg, and 301pb respectively corresponding to red, green, and blue are disposed in a direction perpendicular to the array direction of FIG. 16A. It is possible to display a full-color image by controlling a light emission timing of each of the colors. In addition, FIG. 16C shows a structure in which each of the light sources 301pr, 301pg, and 301pb is disposed around a color combining optical system 302.

Thus, in this embodiment, the scanned surface 308 is a reflection-type scanning plane, as in the case of the second embodiment, and the observer observes the light beam that is reflected on the scanned surface 308 and transmits through the optical surface 306 that is the optical path splitting means, and further transmits through the back surface 305c of the free-form curved surface mirror. Accordingly, it is possible to bend the optical path from the scanning device 304 to the scanned surface 308 and the optical path from the scanned surface 308 to the position of the pupil of the observer. In other words, the optical path from the scanning device 304 to the scanned surface 308 and the optical path from the scanned surface 308 to the position of the pupil of the observer can be disposed in the same space by being overlapped. Thus, the construction of the whole of the scanning type displaying optical system can be downsized.

Figure 17:
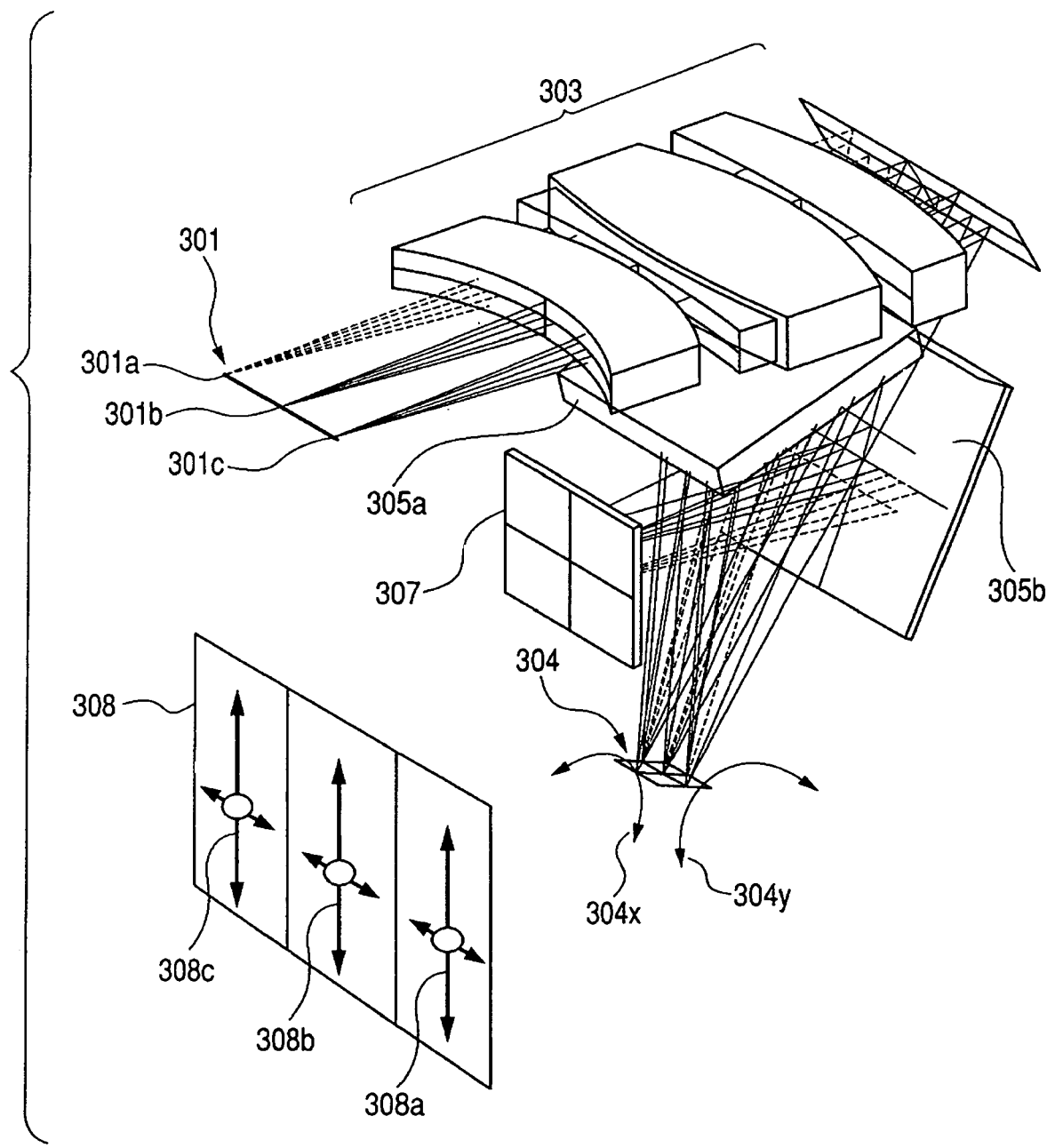
FIG. 17 is a schematic diagram of a structure of another form of the image display apparatus according to the third embodiment of the present invention.

Note that the image display apparatus of this embodiment can be structured as shown in FIG. 17. In FIG. 12, an example of the one-dimensional array light source corresponding to the number of pixels in the horizontal direction is illustrated, and on the other hand, FIG. 17 shows an example of a case where the light source 301 is provided with three light emitting points 301a, 301b, and 301c and the scanning device 304 is the two-dimensional scanning means as in the case of the second embodiment.

With regard to the discrete light emitting points 301a, 301b, and 301c of the light source 301, areas to be scanned 308a, 308b, and 308c corresponding to each of the light sources are formed on the scanned surface 308 by the light source optical system 303 and the scanning optical system 305.

The scanning device 304 two-dimensionally scans each of the areas to control each of the light sources 301, and thus the image can be displayed.

Figure 18:
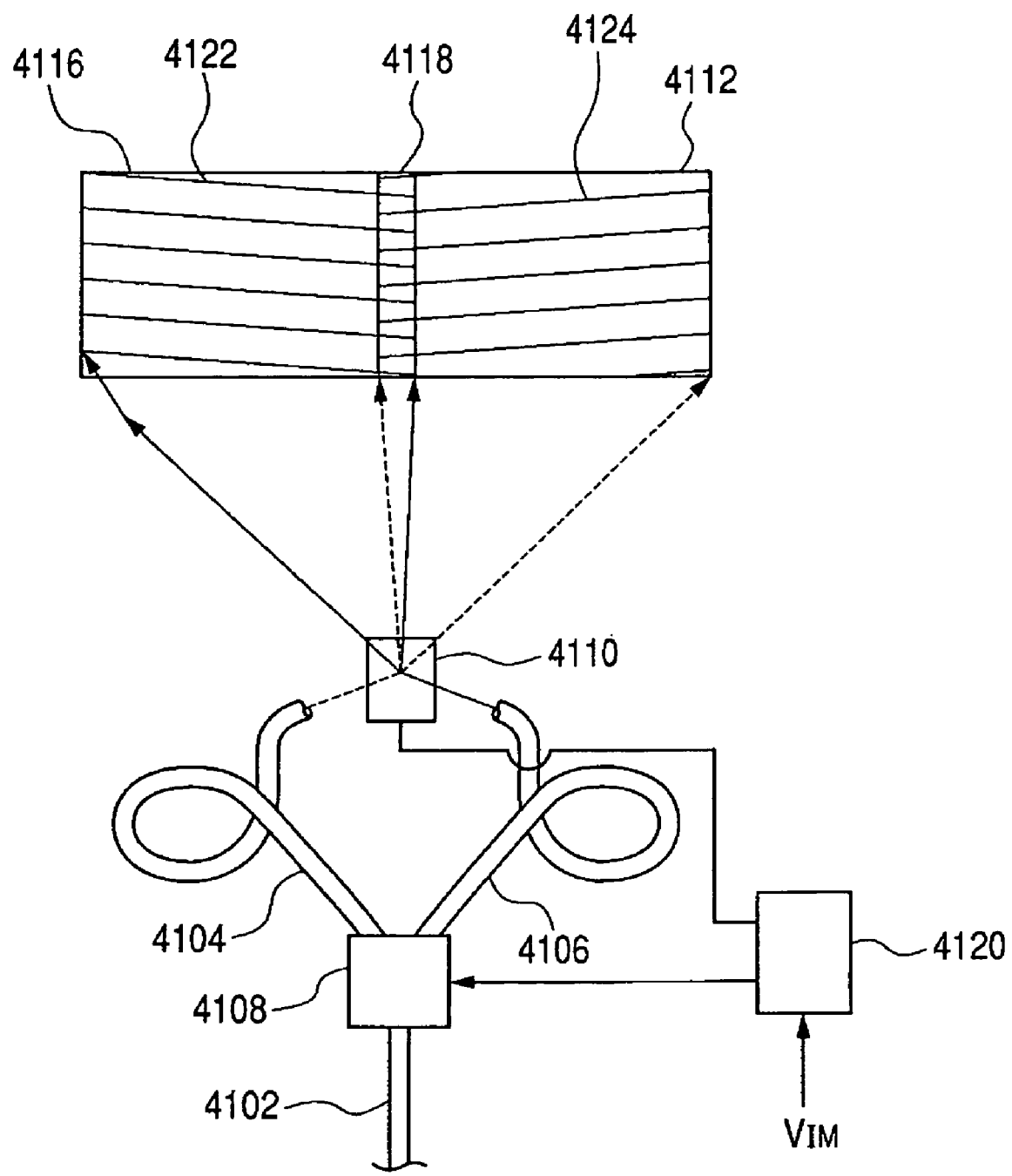
FIG. 18 is a structure diagram of a multi-beam optical system of a conventional example.

The generation of a scanning image by the light source having a plurality of light emitting points is disclosed in, for example, U.S. Pat. No. 6,362,912. FIG. 18 shows an outline view of a method according to U.S. Pat. No. 6,362,912. It discloses a method of generating one scanning image by scanning with the light beams emitted from two to four fiber ends and combining each drawing region on a scanned surface. In FIG. 18, two fiber ends, namely, a light source 4104 and a light source 4106 are provided as the light sources. The scanning of the light beam emitted from each light emitting point is performed by a scanning device 4110, and the image is formed on two areas 4112 and 4122 on an image plane.

With respect to a portion denoted by reference numeral 4118, which is an overlap area of the two areas, image data is electrically corrected so as not to allow the seam of the overlap area to be recognized (see line 47, paragraph 0025 of U.S. Pat. No. 6,362,912). In this embodiment overlap areas between drawing areas 308a, 308b, and 308c are also electrically corrected so as not to be recognized.

Besides, in this embodiment, it is possible to enlarge the pupil diameter for the observation by the observer by allowing the scanned surface 308 to have a reflection action and an optical diffusion action. For a method of allowing the scanned surface 308 to have the diffusion action, it is possible to readily control the optical diffusion action by providing a structural member having periodicity such as the microlens array or the diffractive optical element on the scanned surface 308.

In this embodiment, the explanation is made as to the case where a polarization beam splitter action is utilized as the optical path splitting means, but the structure of this embodiment is not limited to this. That is, a half mirror or the like may be used. In the case where the half mirror is used, the loss of the light amount is greater than the case where the polarization beam splitter is used, but the same effect as to downsizing as in the case where the polarization beam splitter is used can be obtained.

In the case where the polarization beam splitter is used, the external light that is incident from the observer side is not reflected on the scanned surface against the observer.

In this embodiment, the explanation is made as to a case where the surface light-emitting type light emitting diode is used as the light source 301, but the construction of this embodiment is not limited to this. That is, the light source 301 may be the semiconductor laser, the light emitting diode that emits the polarized light, and the like.

Fourth Embodiment

Figure 19:
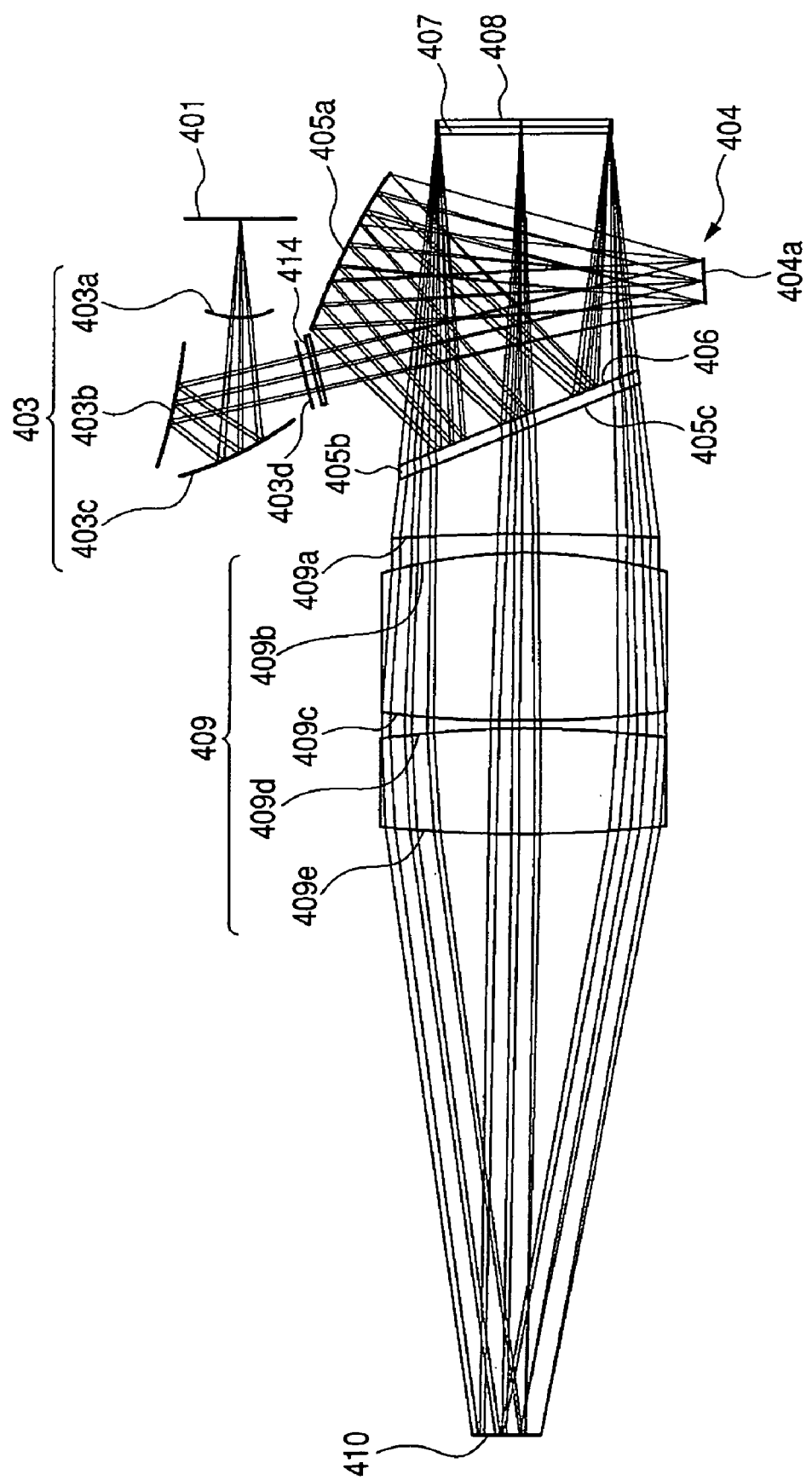
FIG. 19 is a schematic diagram of a structure of a scanning type displaying optical system of an image display apparatus according to a fourth embodiment of the present invention.

FIG. 19 is an outline block diagram showing a scanning type displaying optical system of the image display apparatus according to a fourth embodiment. This embodiment is an embodiment in which the structure of the light source optical system 303 in the third embodiment is substituted for a light source optical system 403 shown in FIGS. 19 and 20.

Figure 20:
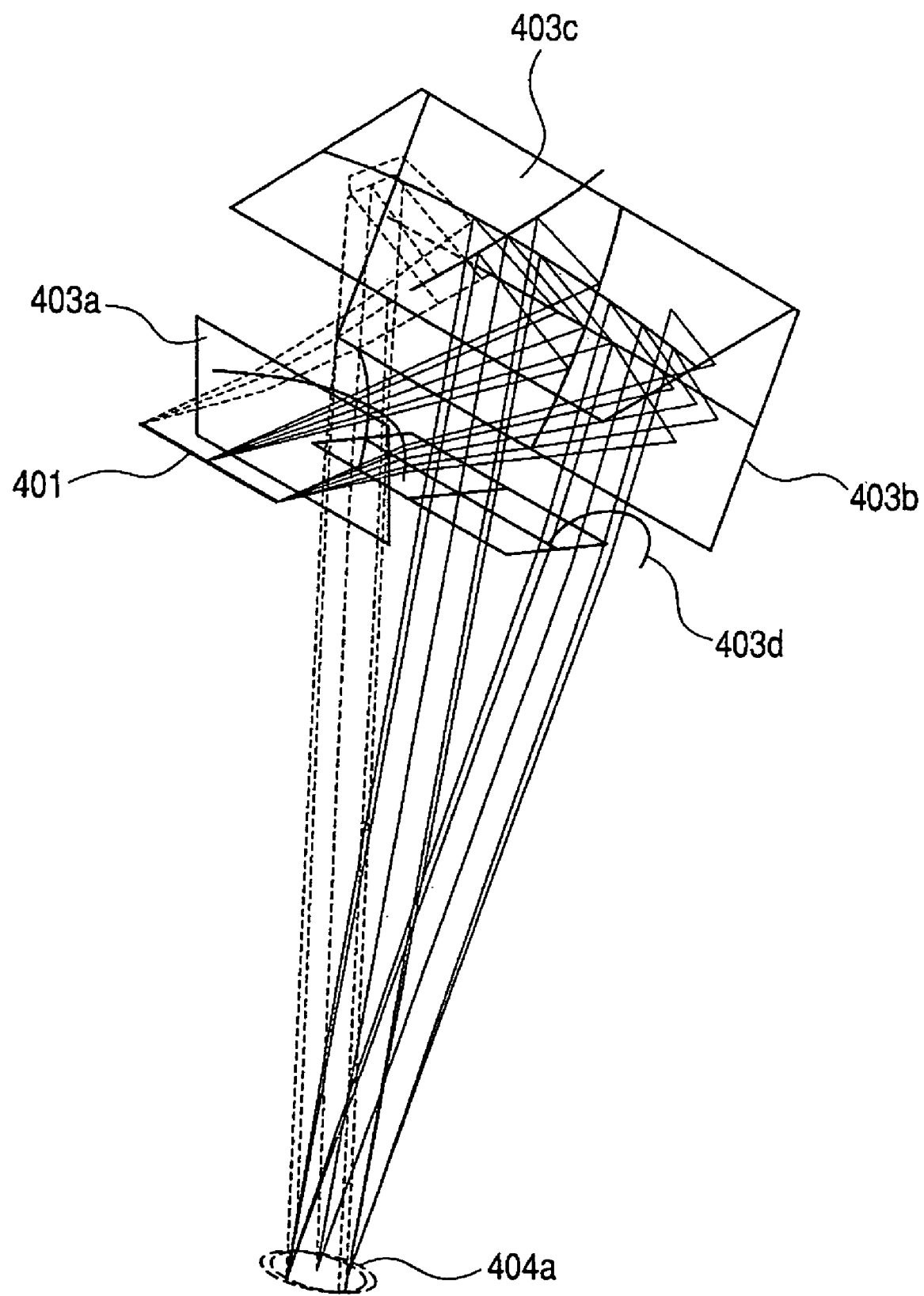
FIG. 20 is a structure diagram of a light source optical system according to the fourth embodiment of the present invention.

The light beam emitted from a light source 401 is made incident into a scanning device 404 via a light source optical system 403 and a polarizing plate 414. FIG. 20 shows a structure of the light source optical system 403 according to this embodiment that corresponds to the structure of the third embodiment shown in FIG. 13. Note that the structure of this embodiment is the same except for this, and accordingly, the explanation thereof is omitted (reference numerals of the corresponding parts and sections are properly changed in FIGS. 19 and 20).

The light source 401 is a one-dimensional light source having emitting points that are respectively driven independently and the line of the light source is arranged in the perpendicular direction on the paper. The light beam emitted form each light source is guided to the scanning device 404 via the light source optical system 403 that has light source optical surfaces 403a, 403b, 403c, and 403d. Besides, principal rays 427 from each light emitting point are condensed into one spot on the scanning device 404. In the drawing, two light beams are shown but in actuality, there are as many light beams as the light emitting points that are independently driven.

In this embodiment, by providing a small-type light source optical system 403 in which the light beam emitted from the light source 401 is reflected on the light source optical surface 403c via the light source optical surface 403a, and then is reflected on the light source optical surface 403b to be guided to the scanning device 404, it is possible to further downsize the scanning optical system while more suitably maintaining the length of the optical path from the light source than in the case of the above embodiments.

As described above, in the first through fourth embodiments, the structures of the eye-piece optical system as shown in FIGS. 6, 12, and 19 are described, but the structure of the eye-piece optical system is not limited to those structures. That is, any structure with which a high-quality image is displayed for the observer may be employed.

In addition, in the first through fourth embodiments, the λ/4 phase plate is disposed separately from the scanned surface, but the scanned surface may be provided with the function of the λ/4 phase plate, for example.

Further, the scanning optical systems according to the second, third, and fourth embodiments are constructed by two reflection planes (free-form curved surface mirrors), but the structure is not limited to this. That is, three or more reflection planes may be provided.

NUMERICAL EMBODIMENTS

Hereinbelow, numerical embodiments corresponding to the second through fourth embodiments are described. In each of the numerical embodiments, a position of the light source is expressed as a reference of an absolute coordinate system. Note that Table 1 corresponds to the second embodiment, Table 2 corresponds to the third embodiment, and Table 3 corresponds to the fourth embodiment.

First, it is assumed that three-dimensional coordinate axes in the absolute coordinate system are a Z-axis, a Y-axis, and an X-axis, respectively. Here, each of the axes is defined as described below.

The Z-axis is a straight line extending from a center of a zeroth plane and passing through a center of a first plane (absolute coordinate origin). This direction is defined as positive.

The Y-axis is a straight line passing through the center of the first plane (absolute coordinate origin) and having an angle of 90 degrees counterclockwise with respect to the Z-axis.

The X-axis is a straight line passing through the origin and perpendicular to the Z- and Y-axes.

Besides, in expressing a plane form of an i-th plane that constitutes the optical system, setting a local coordinate system, the plane form is expressed by a function in accordance with the local coordinate system. A tilt angle within a YZ plane of the ith plane is expressed by an angle θgi (unit: degree) with a counterclockwise direction being positive with respect to the Z-axis of the absolute coordinate system. In this embodiment, the tilt angle is set within the YZ plane only. The y- and x-axes of the local coordinate system (x, y, and z) of the ith plane are within the YZ plane of the absolute coordinate system, and are tilted with the angle θgi in the YZ plane. The axes are defined as described below.

The z-axis is a straight line passing through the origin of the local coordinate system and having an angle of θi counterclockwise within the YZ plane with respect to the Z-axis of the absolute coordinate system.

The y-axis is a straight line passing through the origin of the local coordinate system and having an angle of 90 degrees counterclockwise within the YZ plane with respect to the Z-axis direction.

The x-axis is a straight line passing through the origin of the local coordinate system and perpendicular to the YZ plane.

In addition, in each of the numerical embodiments, Ndi and vdi expresses a refractive index and an Abbe number of a line d between the i-th plane and an (i+1)-th plane, respectively.

Besides, a form of the plane that has no rotationally symmetrical axis is expressed by expressions as described below. In the numerical embodiments, the plane is expressed as a rotationally asymmetrical plane (in the tables, SPS or XYP).

$$z = \frac{cr^2}{1+\sqrt{1-(1+k)c^2r^2}} + c2x + c3y + c4x^2 + c5xy + c6y^2 + c7x^3 + \\ c8x^2y + c9xy^2 + c10y^3 + c11x^4 + c12x^3y + c13x^2y^2 + c14xy^2 + \\ c15y^4 + c16x^5 + c17x^4y + c18x^3y^2 + c19x^2y^3 + c20xy^4 + c21y^5 + \\ c22x^6 + c23x^5y + c24x^4y^2 + c25x^3y^2 + c26x^2y^4 + c27xy^5 + \\ c28y^6 + c29x^7 + c30x^6y + c31x^5y^2 + c32x^4y^3 + c33x^3y^4 + \\ c34x^2y^5 + c35xy^6 + c36y^7 + c37x^8 + c38x^7y + c39x^6y^2 + \\ c40x^5y^3 + c41x^4y^4 + c42x^3y^5 + c43x^3y^6 + c44xy^7 + c45y^8$$

The function is a function that defines the plane form of the local coordinate system (x, y, and z) of the i-th plane. Besides, by letting a term related to an odd-number order of x in the local coordinate system be zero, a plane symmetrical to the yz plane can be obtained.

In this embodiment, surface vertices of each surface is subjected only to a shift decentering in the y- and z-axes directions and a tilt decentering about the x-axis. Accordingly, a conventional meridional section and a local meridional section are in the same cross section, but a conventional sagittal section and a local sagittal section of each plane are mutually different.

In Tables 1-1 through 3-2 in the numerical embodiments, radii of curvature rx and ry at the origin of the coordinates of each optical surface (a radius of curvature on the local meridional section and a radius of curvature on the local sagittal section) and a distance between local planes express a value d of a distance between two hit pints of a current plane and a next plane (a distance on a reference light beam: the value obtained without an air conversion), eccentricity amounts shift and tilt, a refractive index nd, and an Abbe number vd.

Besides, a plane whose form is a free-form curved surface is expressed as "XYP", a plane that is a spherical plane is expressed as "SPH", and a plane that is a rotationally symmetrical and aspherical is expressed as "ASP". Each modulus is shown in a lower column of the table. "M" expresses that a plane is a reflection plane.

Numerical Embodiment 1

The scanning device 204 is a seventh plane, and a deflection angle of the scanning device in a horizontal direction (an oscillation angle with an inside of a paper plane as an axis, in a direction perpendicular to the paper plane) is ±6.00 degrees, and a deflection angle of the scanning device in a perpendicular direction (an oscillation angle within a paper plane with a direction perpendicular to the paper plane as the axis) is ±4.80 degrees. Further, the numerical aperture of the light source is 0.08.

The plane numbers and the reference symbols shown in FIG. 6 correspond to each other as described below.

The light source 201: Plane #1

The incidence plane 202a of the color combining optical system 202: Plane #2

The exit plane 202b of the color combining optical system 202: Plane #3

The optical surface 203a of the light source optical system 203: Plane #4

The optical surface 203b of the light source optical system 203: Plane #5

The optical surface 203c of the light source optical system 203: Plane #6

The deflecting mirror 215: Plane #7

The scanning device 204: Plane #8

The first scanning plane 205a of the scanning optical system 205: Plane #9

The second scanning plane 205b of the scanning optical system 205: Plane #10 (the optical surface 206)

The incidence plane 207a of the λ/4 phase plate 207: Plane #11 and plane #15

The incidence plane 207b of the λ/4 phase plate 207: Plane #12 and plane #14

The scanned surface 208: Plane #13

The back surface 205c of the optical surface: Plane #17

The optical surface 209a of the eye-piece optical system 209: Plane #18

The optical surface 209b of the eye-piece optical system 209: Plane #19

The optical surface 209c of the eye-piece optical system 209: Plane #20

The optical surface 209d of the eye-piece optical system 209: Plane #21

The optical surface 209e of the eye-piece optical system 209: Plane #22

The pupil 210 of the observer: Plane #23

Figure 21:
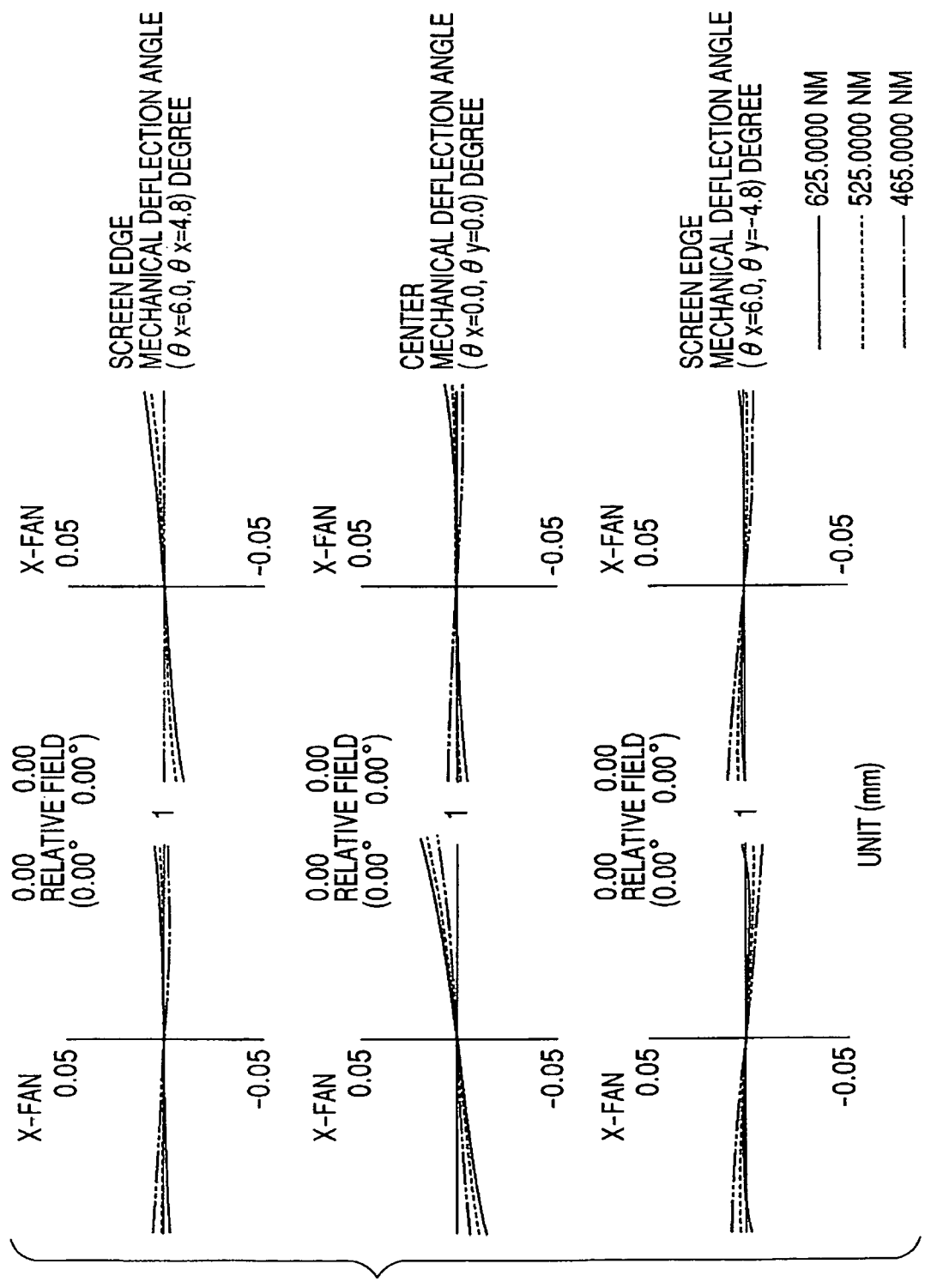
FIG. 21 is an aberration chart according to numerical embodiment 1 (second embodiment) of the present invention.

Besides, aberration charts of the aberration on the scanned surface 208 in this numerical embodiment are shown in FIG. 21.

TABLE 1-1

| type | sur | Yg | Zg | thita | ry | rx | d | shift | tilt | nd | νd |
|---|---|---|---|---|---|---|---|---|---|---|---|
|  | 1 | 0.0000 | 0.0000 | 0.0000 | ∞ | ∞ | 2.0000 | 0.0000 | 0.0000 | 1.0000 |  |
|  | 2 | 0.0000 | 2.0000 | 0.0000 | ∞ | ∞ | 8.0000 | 0.0000 | 0.0000 | 1.5160 | 64.1400 |
|  | 3 | 0.0000 | 10.0000 | 0.0000 | ∞ | ∞ | 0.5000 | 0.0000 | 0.0000 | 1.0000 |  |
|  | 4 | 0.0000 | 10.5000 | 0.0000 | 4.1716 | 4.1716 | 1.5000 | 0.0000 | 0.0000 | 1.6200 | 36.2600 |
|  | 5 | 0.0000 | 12.0000 | 0.0000 | 1.8959 | 1.8959 | 5.0000 | 0.0000 | 0.0000 | 1.5160 | 64.1400 |
|  | 6 | 0.0000 | 17.0000 | 0.0000 | −16.7663 | −16.7663 | 5.0000 | 0.0000 | 0.0000 | 1.0000 |  |
| M | 7 | 0.0000 | 22.0000 | 30.0000 | ∞ | ∞ | −15.0000 | 0.0000 | 30.0000 | −1.0000 |  |
| M | 8 | −25.9808 | 7.0000 | 69.4000 | ∞ | ∞ | 0.0000 | −25.9810 | 69.4000 | 1.0000 |  |
| XYP-M | 9 | −5.1891 | 14.6237 | 72.7424 | ∞ | ∞ | 1.1430 | −5.1890 | 72.7420 | −1.0000 |  |
| XYP-M | 10 | −19.3716 | 15.7666 | 27.8928 | ∞ | ∞ | −15.1570 | −19.3720 | 27.8930 | 1.0000 |  |
|  | 11 | −13.1034 | 1.8512 | −0.2006 | ∞ | ∞ | −0.5000 | −13.1030 | −0.2010 | 1.5160 | 64.1400 |
|  | 12 | −13.1052 | 1.3513 | −0.2006 | ∞ | ∞ | −0.5000 | −13.1050 | −0.2010 | 1.0000 |  |
| M | 13 | −13.1069 | 0.8513 | −0.2006 | ∞ | ∞ | 0.5000 | −13.1070 | −0.2010 | −1.0000 |  |
|  | 14 | −13.1052 | 1.3513 | −0.2006 | ∞ | ∞ | 0.5000 | −13.1050 | −0.2010 | −1.5160 | 64.1400 |
|  | 15 | −13.1034 | 1.8512 | −0.2006 | ∞ | ∞ | 13.9150 | −13.1030 | −0.2010 | −1.0000 |  |
| XYP | 16 | −19.3716 | 15.7666 | 27.8927 | ∞ | ∞ | 1.1070 | −19.3720 | 27.8930 | −1.5200 | 55.0000 |
| XYP | 17 | −19.3677 | 16.8733 | 27.8927 | ∞ | ∞ | 6.9780 | −19.3680 | 27.8930 | −1.0000 |  |
|  | 18 | −13.0264 | 23.8511 | −0.2006 | 30.2540 | 30.2540 | 1.5000 | −13.0260 | −0.2010 | −1.6030 | 38.0300 |
|  | 19 | −13.0212 | 25.3511 | −0.2006 | −12.4562 | −12.4562 | 12.0000 | −13.0210 | −0.2010 | −1.6030 | 60.6400 |
|  | 20 | −12.9792 | 37.3510 | −0.2006 | 27.8705 | 27.8705 | 0.5000 | −12.9790 | −0.2010 | −1.0000 |  |
|  | 21 | −12.9774 | 37.8510 | −0.2006 | −27.2811 | −27.2811 | 5.0000 | −12.9770 | −0.2010 | −1.6030 | 60.6400 |
|  | 22 | −12.9599 | 42.8510 | −0.2006 | −787.9940 | −787.9940 | 17.0000 | −12.9600 | −0.2010 | −1.0000 |  |
|  | 23 | −12.9004 | 59.8509 | −0.2005 | ∞ | ∞ | 0.0000 | −12.9000 | −0.2010 | −1.0000 |  |

TABLE 1-2

No. 1
SPH
rdy = 1.0000e+018
No. 2
SPH
rdy = 1.0000e+018
No. 3
SPH
rdy = 1.0000e+018
No. 4
SPH
rdy = 4.1716e+000
No. 5
SPH
rdy = 1.8959e+000
No. 6
SPH
rdy = −1.6766e+001
No. 7
SPH
rdy = 1.0000e+018
No. 8
SPH
rdy = 1.0000e+018
No. 9
XYP
rdy = 1.0000e+018 c04 = −4.9200e−003 c06 = −3.6841e−003 c08 = −6.3219e−005
c10 = −5.4226e−005 c11 = −4.9483e−006 c13 = −4.9844e−005
c17 = −1.2896e−006 c19 = 4.8728e−006 c21 = −1.3853e−007 c22 = 2.2895e−007
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 10
XYP
rdy = 1.0000e+018 c04 = 9.1374e−003 c06 = 1.0969e−002 c08 = 3.9362e−004
c10 = 1.1110e−004 c11 = −2.2555e−005 c13 = 5.6976e−005
c17 = −1.2890e−006 c19 = 1.6114e−007 c21 = −9.1085e−007 c22 = 1.9684e−007
c24 = 8.8711e−009 c26 = −1.4527e−007 c28 = −2.6005e−008
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 11
SPH
rdy = 1.0000e+018
No. 12
SPH
rdy = 1.0000e+018
No. 13
SPH
rdy = 1.0000e+018
No. 14
SPH
rdy = 1.0000e+018
No. 15
SPH
rdy = 1.0000e+018
No. 16
XYP
rdy = 1.0000e+018 c04 = 8.9925e−003 c06 = 1.1095e−002 c08 = 2.1520e−004
c10 = 1.2354e−004 c11 = −1.7415e−005 c13 = 1.1873e−005
c17 = 5.0501e−007 c19 = −3.8593e−006 c21 = −9.1882e−007 c22 = 1.8436e−007
c24 = 1.2258e−007 c26 = 2.5175e−007 c28 = 2.3983e−008
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 17
XYP
rdy = 1.0000e+018 c04 = 6.8258e−003 c06 = 1.4787e−002 c08 = −6.0345e−004
c10 = 1.0696e−003 c11 = 3.1533e−005 c13 = −1.3266e−004
c17 = 1.7749e−006 c19 = −1.5955e−005 c21 = 4.4497e−006 c22 = 3.2993e−007
c24 = 2.2347e−007 c26 = −6.8130e−007 c28 = 7.6974e−008
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 18
SPH
rdy = 3.0254e+001
No. 19
SPH
rdy = −1.2456e+001
No. 20
SPH
rdy = 2.7871e+001
No. 21
SPH
rdy = −2.7281e+001
No. 22
No. 23

TABLE 1-2-continued

| SPH | SPH |
|---|---|
| rdy = −7.8799e+002 | rdy = 1.0000e+018 |

Numerical Embodiment 2

The scanning device 304 of this numerical embodiment is a tenth plane, and a deflection angle of the scanning device in a perpendicular direction (an oscillation angle in a paper plane with a direction perpendicular to the paper plane as an axis) is ±5.0 degrees. Further, the numerical aperture of the light source is 0.05.

The plane numbers and the reference symbols shown in FIG. 12 correspond to each other as described below.

The light source 301: Plane #1

The optical surface 303a of the light source optical system 303: Plane #2

The optical surface 303b of the light source optical system 303: Plane #3

The optical surface 303c of the light source optical system 303: Plane #4

The optical surface 303d of the light source optical system 303: Plane #5

The optical surface 303e of the light source optical system 303: Plane #6

The optical surface 303f of the light source optical system 303: Plane #7

The optical surface 303g of the light source optical system 303: Plane #8

The deflecting mirror 315: Plane #9

The scanning device 304: Plane #10

The first scanning plane 305a of the scanning optical system 305: Plane #11

The second scanning plane 305b of the scanning optical system 305: Plane #12 (the optical surface 306) and plane #18

The incidence plane 307a of the λ/4 phase plate 307: Plane #13 and plane #17

The incidence plane 307b of the λ/4 phase plate 307: Plane #14 and plane #16

The scanned surface 308: Plane #15

The back surface 305c of the optical surface 306: Plane #19

The optical surface 309a of the eye-piece optical system 309: Plane #20

The optical surface 309b of the eye-piece optical system 309: Plane #21

The optical surface 309c of the eye-piece optical system 309: Plane #22

The optical surface 309d of the eye-piece optical system 309: Plane #23

The optical surface 309e of the eye-piece optical system 309: Plane #24

The pupil 310 of the observer: Plane #25

Figure 22A:
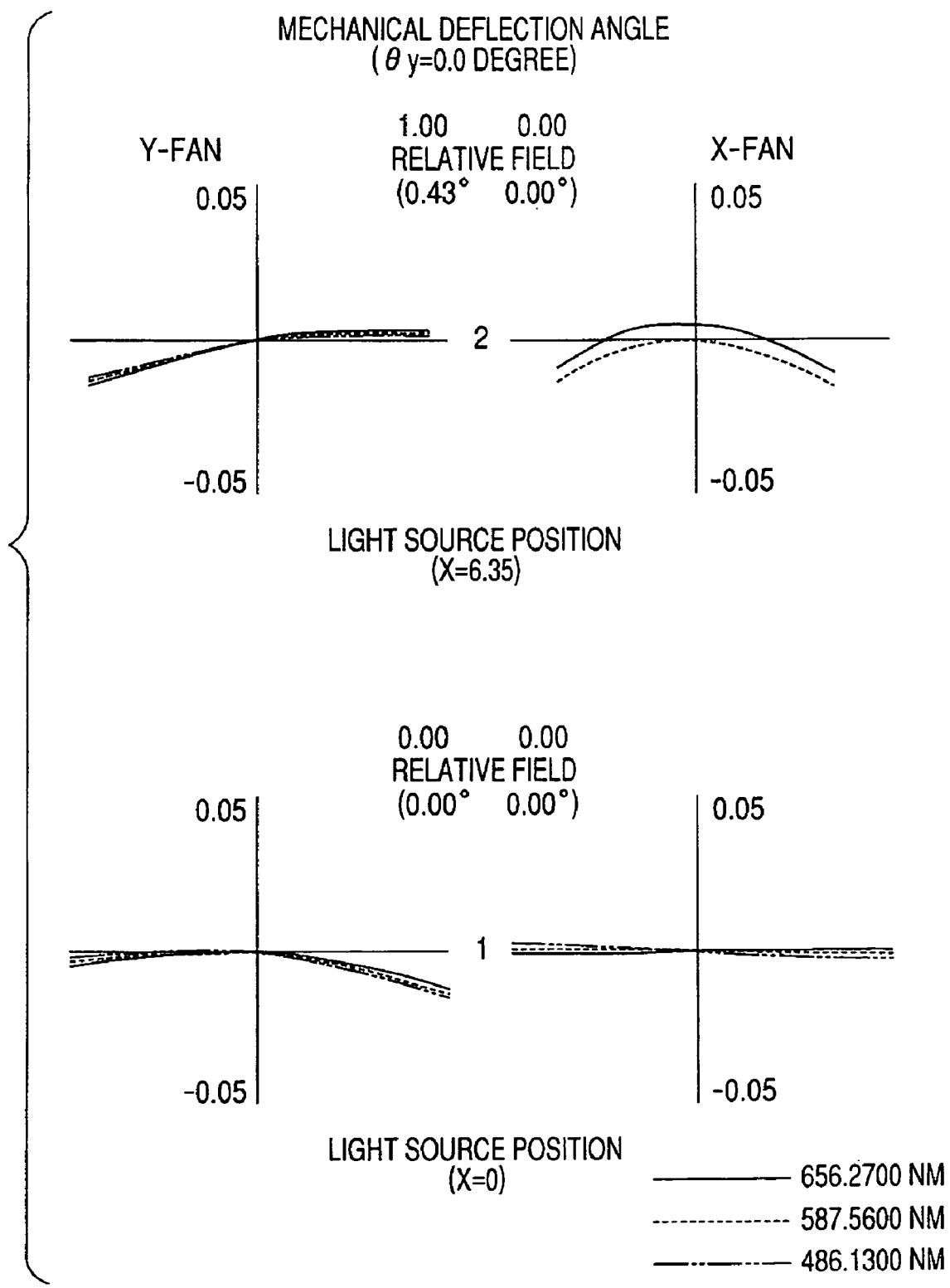
FIG. 22A is an aberration chart according to numerical embodiment 2 (third embodiment) of the present invention.
Figure 22B:
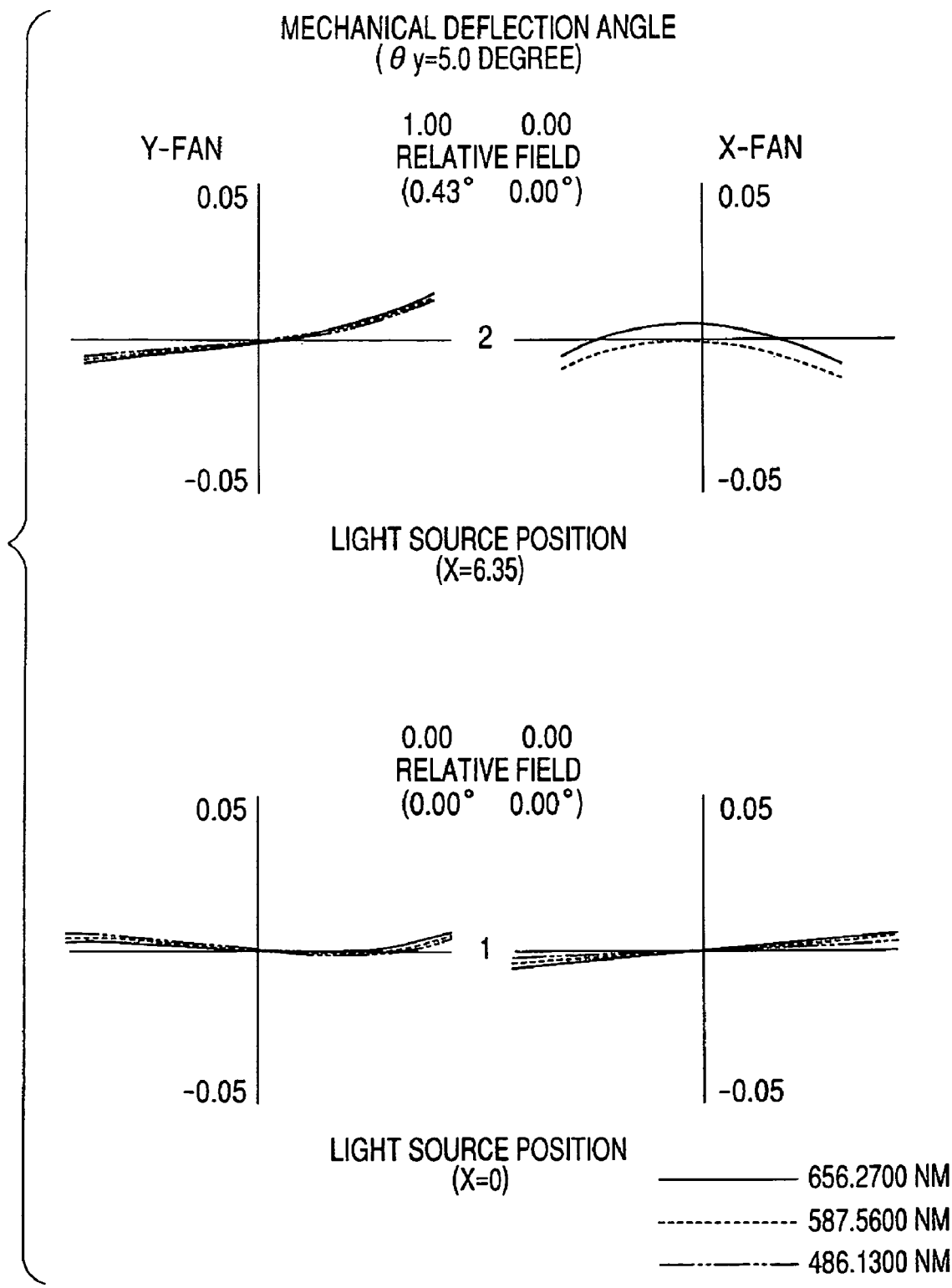
FIG. 22B is an aberration chart according to numerical embodiment 2 (third embodiment) of the present invention.
Figure 22C:
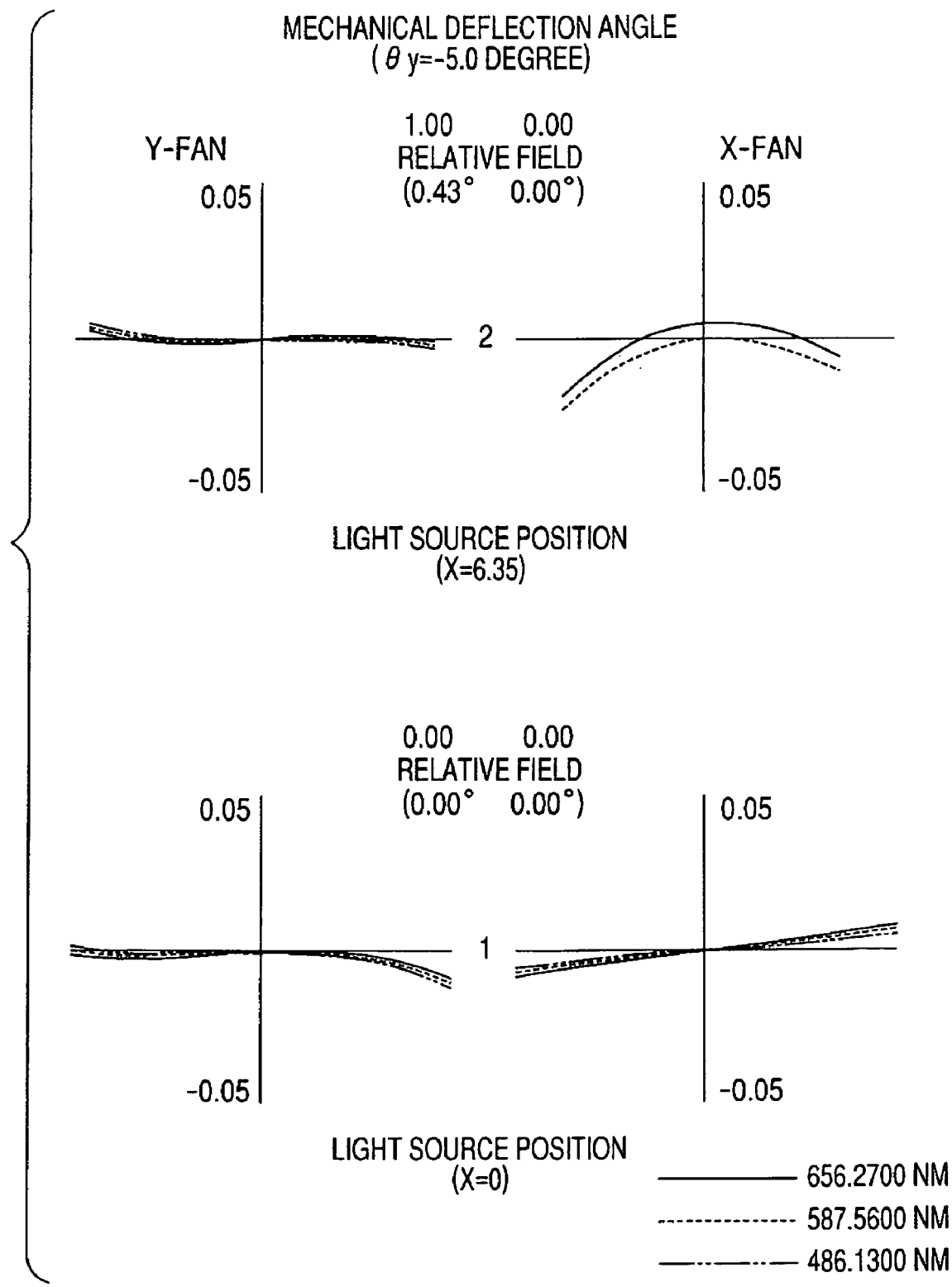
FIG. 22C is an aberration chart according to numerical embodiment 2 (third embodiment) of the present invention.

Besides, aberration charts of the aberration on the scanned surface 308 in this numerical embodiment are shown in FIGS. 22A through 22C.

TABLE 2-1

| type | sur | Yg | Zg | thita | ry | rx | d | shift | tilt | nd | ν d |
|---|---|---|---|---|---|---|---|---|---|---|---|
| | 1 | 0.0000 | 0.0000 | 0.0000 | ∞ | ∞ | 12.4430 | 0.0000 | 0.0000 | 1.0000 | |
| | 2 | 0.0000 | 15.4428 | 0.0000 | −15.6535 | −15.6535 | 5.1560 | 0.0000 | 0.0000 | 1.6520 | 58.5500 |
| | 3 | 0.0000 | 20.5993 | 0.0000 | −16.3230 | −16.3230 | 0.5000 | 0.0000 | 0.0000 | 1.0000 | |
| | 4 | 0.0000 | 21.0993 | 0.0000 | −59.1856 | −59.1856 | 1.0000 | 0.0000 | 0.0000 | 1.8470 | 23.7800 |
| | 5 | 0.0000 | 22.0993 | 0.0000 | 61.0933 | 61.0933 | 8.0640 | 0.0000 | 0.0000 | 1.6030 | 60.6400 |
| | 6 | 0.0000 | 30.1636 | 0.0000 | −22.8418 | −22.8418 | 0.5000 | 0.0000 | 0.0000 | 1.0000 | |
| | 7 | 0.0000 | 30.6636 | 0.0000 | −71.7203 | −71.7203 | 4.0000 | 0.0000 | 0.0000 | 1.6970 | 55.5300 |
| | 8 | 0.0000 | 34.6636 | 0.0000 | −30.8404 | −30.8404 | 3.0000 | 0.0000 | 0.0000 | 1.0000 | |
| M | 9 | 0.0000 | 37.6636 | 30.0000 | ∞ | ∞ | −15.0000 | 0.0000 | 30.0000 | −1.0000 | |
| M | 10 | −25.9808 | 22.6636 | 69.4000 | ∞ | ∞ | 0.0000 | −25.9810 | 69.4000 | 1.0000 | |
| XYP-M | 11 | −5.1891 | 30.2872 | 72.7424 | ∞ | ∞ | 1.1430 | −5.1890 | 72.7420 | −1.0000 | |
| XYP-M | 12 | −19.3716 | 31.4301 | 27.8928 | ∞ | ∞ | −15.1570 | −19.3720 | 27.8930 | 1.0000 | |
| | 13 | −13.1034 | 17.5148 | −0.2006 | ∞ | ∞ | −0.5000 | −13.1030 | −0.2010 | 1.5160 | 64.1400 |
| | 14 | −13.1052 | 17.0148 | −0.2006 | ∞ | ∞ | −0.5000 | −13.1050 | −0.2010 | 1.0000 | |
| M | 15 | −13.1069 | 16.5148 | −0.2006 | ∞ | ∞ | 0.5000 | −13.1070 | −0.2010 | −1.0000 | |
| | 16 | −13.1052 | 17.0148 | −0.2006 | ∞ | ∞ | 0.5000 | −13.1050 | −0.2010 | −1.5160 | 64.1400 |
| | 17 | −13.1034 | 17.5148 | −0.2006 | ∞ | ∞ | 13.9150 | −13.1030 | −0.2010 | −1.0000 | |
| XYP | 18 | −19.3716 | 31.4301 | 27.8927 | ∞ | ∞ | 1.0000 | −19.3720 | 27.8930 | −1.5200 | 55.0000 |
| XYP | 19 | −19.3681 | 32.4301 | 27.8927 | ∞ | ∞ | 6.0850 | −19.3680 | 27.8930 | −1.0000 | |
| | 20 | −13.0299 | 38.5147 | −0.2006 | 38.7315 | 38.7315 | 1.5000 | −13.0300 | −0.2010 | −1.6030 | 38.0300 |
| | 21 | −13.0247 | 40.0147 | −0.2006 | −11.3942 | −11.3942 | 12.0000 | −13.0250 | −0.2010 | −1.6030 | 60.6400 |
| | 22 | −12.9827 | 52.0146 | −0.2006 | 31.7214 | 31.7214 | 0.5000 | −12.9830 | −0.2010 | −1.0000 | |
| | 23 | −12.9809 | 52.5146 | −0.2006 | −26.4916 | −26.4916 | 5.0000 | −12.9810 | −0.2010 | −1.6030 | 60.6400 |
| | 24 | −12.9634 | 57.5146 | −0.2006 | −468.5918 | −468.5918 | 17.0000 | −12.9630 | −0.2010 | −1.0000 | |
| | 25 | −12.9039 | 74.5145 | −0.2006 | ∞ | ∞ | 0.0000 | −12.9040 | −0.2010 | −1.0000 | |

TABLE 2-2

| No. 1 | No. 2 | No. 3 | No. 4 |
|---|---|---|---|
| SPH | SPH | SPH | SPH |
| rdy = 1.0000e+018 | rdy = −1.5654e+001 | rdy = −1.6323e+001 | rdy = −5.9186e+001 |
| No. 5 | No. 6 | No. 7 | No. 8 |
| SPH | SPH | SPH | SPH |
| rdy = 6.1093e+001 | rdy = −2.2842e+001 | rdy = −7.1720e+001 | rdy = −3.0840e+001 |
| No. 9 | No. 10 | | |
| SPH | SPH | | |
| rdy = 1.0000e+018 | rdy = 1.0000e+018 | | |

No. 11
XYP
rdy = 1.0000e+018 c04 = −5.0788e−003 c06 = −3.6876e−003 c08 = −6.4166e−005
c10 = −7.5251e−006 c11 = 2.3199e−006 c13 = −1.5128e−005
c17 = 1.9263e−007 c19 = 3.3323e−007 c21 = 4.5151e−007 c22 = 0.0000e+000
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 12
XYP
rdy = 1.0000e+018 c04 = 8.9476e−003 c06 = 1.1617e−002 c08 = −1.5910e−004
c10 = 3.1842e−004 c11 = −7.8520e−006 c13 = −1.8015e−006
c17 = −9.6914e−007 c19 = 9.9830e−008 c21 = 1.7895e −007 c22 = −1.5386e−008
c24 = −3.0794e−008 c26 = −1.4055e−008 c28 = −8.7630e−009
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000

| No. 13 | No. 14 | No. 15 | No. 16 |
|---|---|---|---|
| SPH | SPH | SPH | SPH |
| rdy = 1.0000e+018 | rdy = 1.0000e+018 | rdy = 1.0000e+018 | rdy = 1.0000e+018 |

No. 17
SPH
rdy = 1.0000e+018
No. 18
XYP
rdy = 1.0000e+018 c04 = 8.9476e−003 c06 = 1.1617e−002 c08 = −1.5910e−004
c10 = 3.1842e−004 c11 = −7.8520e−006 c13 = −1.8015e−006
c17 = −9.6914e−007 c19 = 9.9830e−008 c21 = 1.7895e−007 c22 = −1.5386e−008
c24 = −3.0794e−008 c26 = 1.4055e−008 c28 = −8.7630e−009
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 19
XYP
rdy = 1.0000e+018 c04 = 8.9476e−003 c06 = 1.1617e−002 c08 = −1.5910e−004
c10 = 3.1842e−004 c11 = −7.8520e−006 c13 = −1.8015e−006
c17 = −9.6914e−007 c19 = 9.9830e−008 c21 = 1.7895e−007 c22 = −1.5386e−008
c24 = −3.0794e−008 c26 = −1.4055e−008 c28 = −8.7630e−009
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000

| No. 20 | No. 21 | No. 22 | No. 23 |
|---|---|---|---|
| SPH | SPH | SPH | SPH |
| rdy = 3.8731e+001 | rdy = −1.1394e+001 | rdy = 3.1721e+001 | rdy = −2.6492e+001 |
| No. 24 | No. 25 | | |
| SPH | SPH | | |
| rdy = −4.6859e+002 | rdy = 1.0000e+018 | | |

Numerical Embodiment 3

The scanning device 404 of this numerical embodiment is a sixth plane, and a deflection angle of the scanning device in a perpendicular direction (an oscillation angle in a paper plane with a direction perpendicular to the paper plane as an axis) is ±4.76 degrees. Further, the numerical aperture of the light source is 0.07.

The plane numbers and the reference symbols shown in FIG. 19 correspond to each other as described below.

The light source 401: Plane #1
The optical surface 403a of the light source optical system 403: Plane #2
The optical surface 403b of the light source optical system 403: Plane #3
The optical surface 403c of the light source optical system 403: Plane #4
The optical surface 403d of the light source optical system 403: Plane #5
The optical surface 403e of the light source optical system 403: Plane #6
The optical surface 403f of the light source optical system 403: Plane #7
The optical surface 403g of the light source optical system 403: Plane #8
The deflecting mirror 415: Plane #9
The scanning device 404: Plane #10
The first scanning plane 405a of the scanning optical system 405: Plane #11
The second scanning plane 405b of the scanning optical system 405: Plane #8 (the optical surface 406) and plane #14
The incidence surface 407a of the λ/4 phase plate 407: Plane #9 and plane #13
The incidence surface 407b of the λ/4 phase plate 407: Plane #10 and plane #12
The scanned surface 408: Plane #11
The back surface 405c of the optical surface 406: Plane #15

The optical surface 409a of the eye-piece optical system 409:
Plane #16

The optical surface 409b of the eye-piece optical system 409:
Plane #17

The optical surface 409c of the eye-piece optical system 409:
Plane #18

The optical surface 409d of the eye-piece optical system 409:
Plane #19

The optical surface 409e of the eye-piece optical system 409:
Plane #20

The pupil 410 of the observer: Plane #21

Figure 23A:
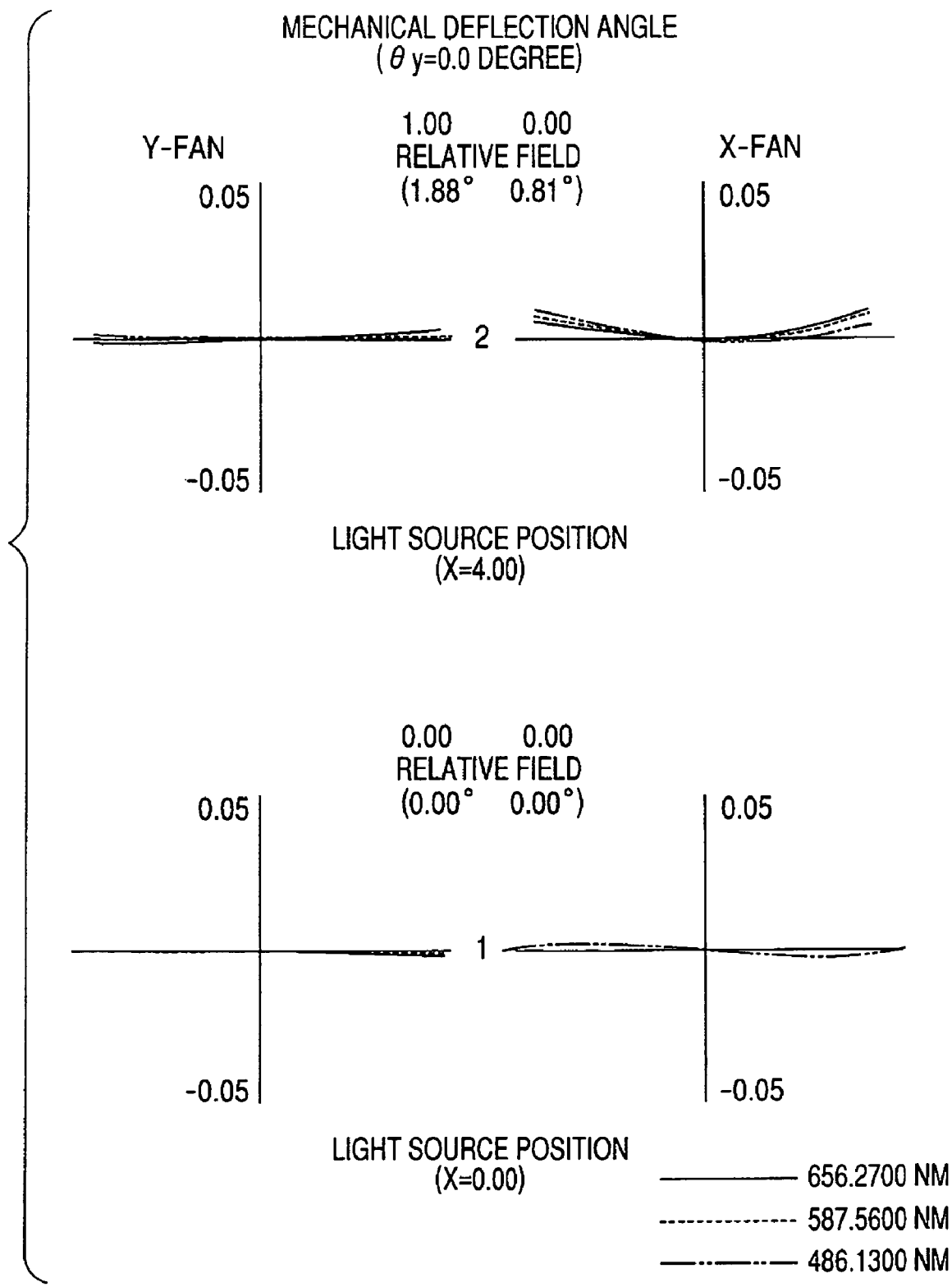
FIG. 23A is an aberration chart according to numerical embodiment 3 (fourth embodiment) of the present invention.
Figure 23B:
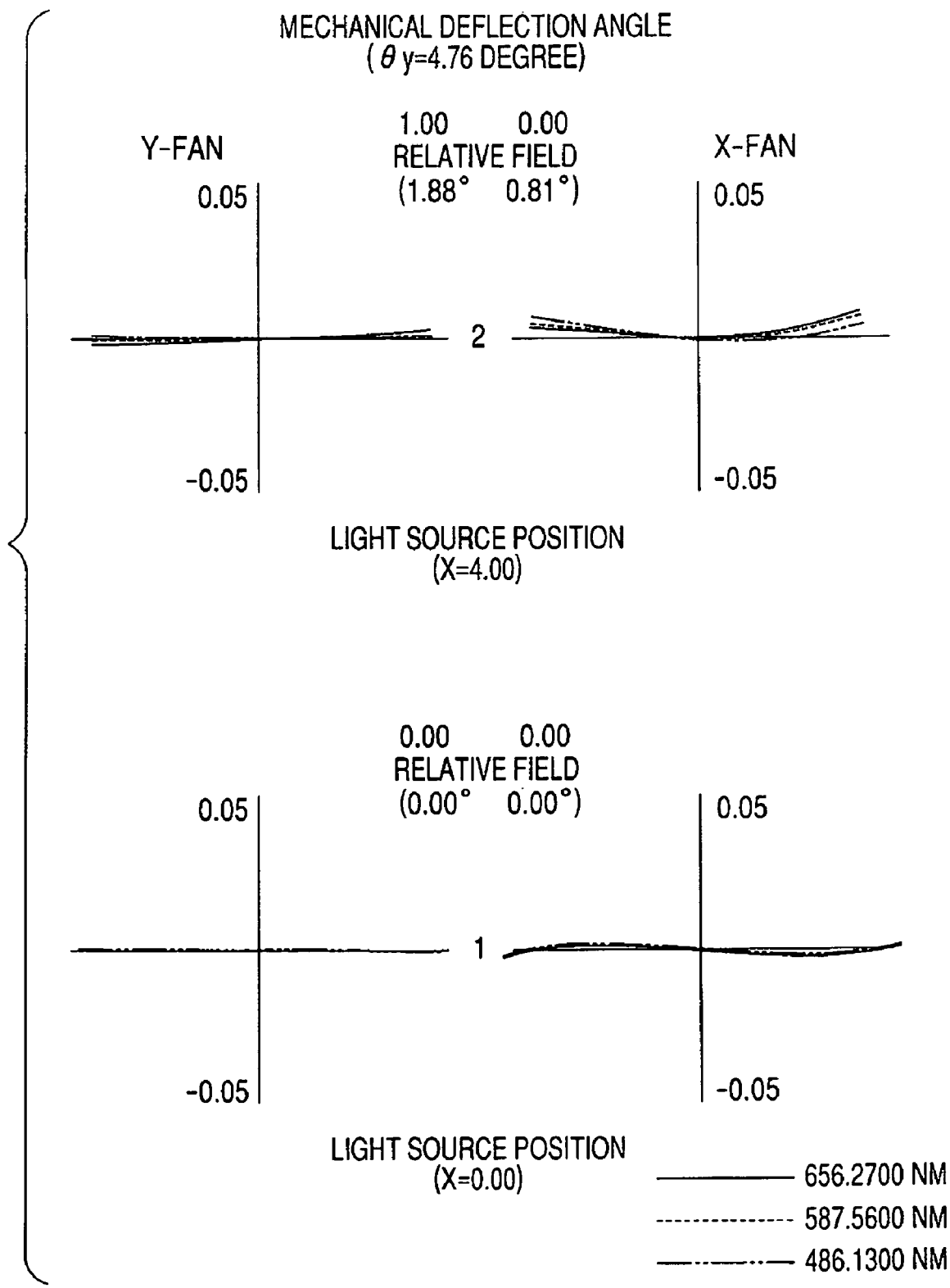
FIG. 23B is an aberration chart according to numerical embodiment 3 (fourth embodiment) of the present invention.
Figure 23C:
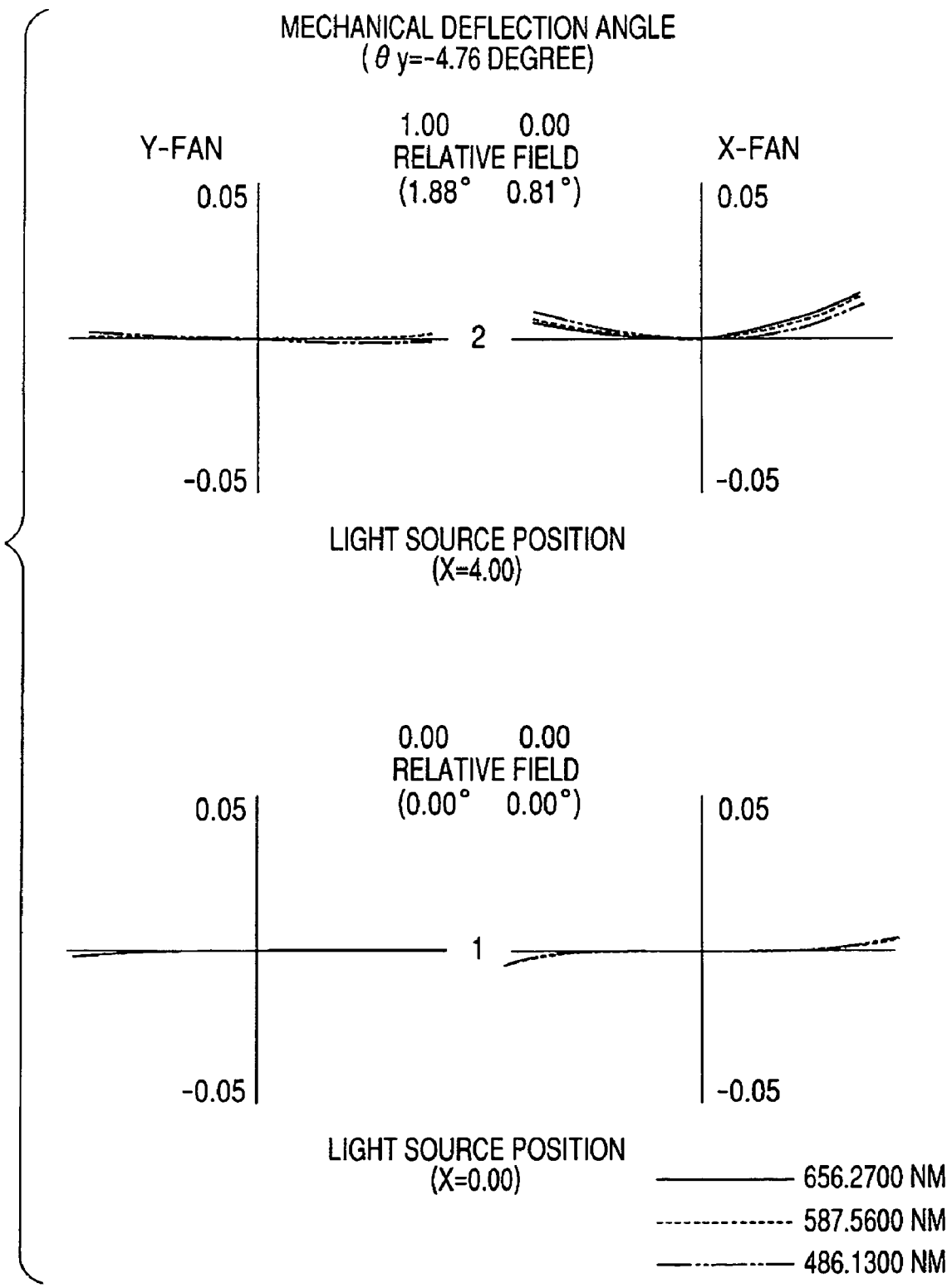
FIG. 23C is an aberration chart according to numerical embodiment 3 (fourth embodiment) of the present invention.

Besides, aberration charts of the aberration on the scanned surface 408 in this numerical embodiment are shown in FIGS. 23A to 23C.

TABLE 3-1

| type | sur | Yg | Zg | thita | ry | rx | d | shift | tilt | nd | νd |
|---|---|---|---|---|---|---|---|---|---|---|---|
|  | 1 | 0.0000 | 0.0000 | 0.0000 | ∞ | ∞ | 7.4060 | 0.0000 | 0.0000 | 1.0000 |  |
| XYP | 2 | 0.0000 | 7.4059 | 0.0000 | ∞ | ∞ | 10.0000 | 0.0000 | 0.0000 | 1.5200 | 55.0000 |
| XYP-M | 3 | 0.0000 | 17.4059 | −26.7923 | ∞ | ∞ | −3.5620 | 0.0000 | −26.7920 | −1.5200 | 55.0000 |
| XYP-M | 4 | 4.8284 | 13.8441 | −78.2587 | ∞ | ∞ | −2.2380 | 4.8280 | −78.2590 | 1.5200 | 55.0000 |
| XYP | 5 | −4.9179 | 11.6060 | −77.0672 | ∞ | ∞ | −6.7140 | −4.9180 | −77.0670 | 1.0000 |  |
| M | 6 | −34.1569 | 4.8918 | −86.6259 | ∞ | ∞ | 0.0000 | −34.1570 | −86.6260 | −1.0000 |  |
| XYP-M | 7 | −7.9442 | 2.0512 | −63.8573 | ∞ | ∞ | 12.8240 | −7.9440 | −63.8570 | 1.0000 |  |
| XYP-M | 8 | −20.2844 | 14.8749 | −21.6614 | ∞ | ∞ | −21.2370 | −20.2840 | −21.6610 | −1.0000 |  |
|  | 9 | −20.4981 | −6.3622 | 0.5766 | ∞ | ∞ | −0.5000 | −20.4980 | 0.5770 | −1.5200 | 55.0000 |
|  | 10 | −20.5031 | −6.8622 | 0.5766 | ∞ | ∞ | −0.5000 | −20.5030 | 0.5770 | −1.0000 |  |
| M | 11 | −20.5082 | −7.3621 | 0.5766 | ∞ | ∞ | 0.0000 | −20.5080 | 0.5770 | 1.0000 |  |
|  | 12 | −20.5082 | −7.3621 | 0.5766 | ∞ | ∞ | 0.5000 | −20.5080 | 0.5770 | 1.5200 | 55.0000 |
|  | 13 | −20.5031 | −6.8622 | 0.5766 | ∞ | ∞ | 21.7370 | −20.5030 | 0.5770 | 1.0000 |  |
| XYP | 14 | −20.2844 | 14.8749 | −21.6613 | ∞ | ∞ | 1.0000 | −20.2840 | −21.6610 | 1.5200 | 55.0000 |
| XYP | 15 | −20.2743 | 15.8749 | −21.6613 | ∞ | ∞ | 7.6850 | −20.2740 | −21.6610 | 1.0000 |  |
|  | 16 | −20.1970 | 23.5604 | 0.5766 | 107.4129 | 107.4129 | 1.5000 | −20.1970 | 0.5770 | 1.8050 | 25.4200 |
|  | 17 | −20.1819 | 25.0603 | 0.5766 | 31.8735 | 31.8735 | 12.4990 | −20.1820 | 0.5770 | 1.6030 | 60.6400 |
|  | 18 | −20.0561 | 37.5597 | 0.5766 | −77.1553 | −77.1553 | 0.5000 | −20.0560 | 0.5770 | 1.0000 |  |
|  | 19 | −20.0511 | 38.0596 | 0.5766 | 58.5085 | 58.5085 | 8.0000 | −20.0510 | 0.5770 | 1.6030 | 60.6400 |
|  | 20 | −19.9706 | 46.0592 | 0.5766 | −89.3903 | −89.3903 | 44.9980 | −19.9710 | 0.5770 | 1.0000 |  |
|  | 21 | −19.5177 | 91.0570 | 0.5766 | ∞ | ∞ | 0.0000 | −19.5180 | 0.5770 | 1.0000 |  |

TABLE 3-2

```
No. 1
SPH
rdy = 1.0000e+018
No. 2
XYP
rdy = 1.0000e+018 c04 = −8.0455e−002 c06 = −6.6287e−002 c08 = 3.0092e−005
c10 = −3.0924e−003 c11 = −2.1022e−004 c13 = −3.9669e−004
c17 = 0.0000e+000 c19 = 0.0000e+000 c21 = 0.0000e+000 c22 = 0.0000e+000
c24 = 0.0000e+000 c28 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 3
XYP
rdy = 1.0000e+018 c04 = −4.4299e−003 c06 = −1.8425e−002 c08 = 1.9182e−004
c10 = −1.0581e−004 c11 = −1.1938e−008 c13 = −8.1769e−006
c17 = 5.7243e−007 c19 = 9.2962e−007 c21 = −3.8860e−008 c22 = 0.0000e+000
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 4
rdy = 1.0000e+018 c04 = 9.9488e−003 c06 = −7.9163e−003 c08 = 2.0512e−004
c10 = −2.3851e−004 c11 = −1.5394e−006 c13 = −8.0077e−006
c17 = 1.8594e−007 c19 = 1.4300e−006 c21 = −9.4263e−006 c22 = 0.0000e+000
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 5
XYP
rdy = 1.0000e+018 c04 = −5.8238e−004 c06 = −1.9856e−003 c08 = 4.9049e−005
c10 = 1.5023e−004 c11 = 7.8774e−006 c13 = 8.6303e−005
c17 = 0.0000e−000 c19 = 0.0000e+000 c21 = 0.0000e+000 c22 = 0.0000e+000
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 6
SPH
rdy = 1.0000e+018
No. 7
XYP
rdy = 1.0000e+018 c04 = 4.3409e−003 c06 = 7.2313e−003 c08 = 8.1919e−006
```

TABLE 3-2-continued

```
c10 = -2.5607e-007 c11-4.0536e-006 c13 = 6.3220e-007
c17 = 7.3340e-008 c19 = 4.0319e-008 c21 = 2.6863e-008 c22 = 0.0000e+000
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 8
XYP
rdy = 1.0000e+018 c04 = -3.4968e-003 c06 = 1.2843e-003 c08 = -2.2898e-005
c10 = -1.4458e-005 c11 = -7.7902e-007 c13 = 2.8147e-006
c17 = 3.0521e-008 c19 = 9.0751e-009 c21 = -1.8387e-008 c22 = 0.0000e+000
c24 = 0.0000e+000 c20 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 9              No. 10             No. 11             No. 12
SPH                SPH                SPH                SPH
rdy = 1.0000e+018  rdy = 1.0000e+018  rdy = 1.0000e+018  rdy = 1.0000e+018
No. 13
SPH
rdy = 1.0000e+018
No. 14
XYP
rdy = 1.0000e+018 c04 = -3.4968e-003 c06 = 1.2843e-003 c08 = -2.2898e-005
c10 = -1.4458e-005 c11 = 7.7902e-007 c13 = 2.8147e-006
c17 = 3.0521e-008 c19 = 9.0751e-009 c21 = -1.8387e-008 c22 = 0.0000e+000
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 15
rdy = 1.0000e+018 c04 = -3.4968e-003 c06 = 1.2843e-003 c08 = -2.2898e-005
c10 = 1.4458e-005 c11 = -7.7902e-007 c13 = 2.8147e-006
c17 = 3.0521e-008 c19 = 9.0751e-009 c21 = -1.8387e-008 c22 = 0.0000e+000
c24 = 0.0000e+000 c26 = 0.0000e+000 c28 = 0.0000e+000
c30 = 0.0000e+000 c32 = 0.0000e+000 c34 = 0.0000e+000 c36 = 0.0000e+000
c37 = 0.0000e+000 c39 = 0.0000e+000 c41 = 0.0000e+000 c43 = 0.0000e+000 c45 = 0.0000e+000
No. 16             No. 17             No. 18             No. 19
SPH                SPH                SPH                SPH
rdy = 1.0741e+002  rdy = 3.1873e+001  rdy = -7.7155e+001 rdy = 5.8508e+001
No. 20             No. 21
SPH                SPH
rdy = -8.9390e+001 rdy = 1.0000e+018
```

This application claims priority from Japanese Patent Application No. 2004-368882 filed Dec. 21, 2004, which is hereby incorporated by reference herein.

What is claimed is:

1. A displaying optical system, comprising:
   a scanning member for deflecting a light emitted from a light source;
   a scanned surface on which an image is formed by scanning with the light deflected by the scanning member, the scanned surface being a reflection surface;
   an optical surface provided at a position common to a first optical path through which a light reflected by the scanned surface travels and a second optical path through which a light from the scanning member to the scanned surface travels, the optical surface, in accordance with a polarization direction, transmitting the light traveling through one of the first optical path and the second optical path and reflecting the light traveling through the other optical path, the optical surface having a rotational asymmetry shape; and
   a phase plate that emits a light which has been incident into the phase plate by changing a state of polarization of the incident light, the phase plate being provided at the position common to the first optical path and the second optical path.

2. An image display apparatus comprising:
   a light source;
   a displaying optical system according to claim 1; and
   a modulation circuit that modulates a light emitted by the light source on a basis of an image signal.

3. A displaying optical system, comprising:
   a first optical system having a scanning member for deflecting a light emitted from a light source;
   a scanned surface on which an image is formed by scanning with the deflected light, the scanned surface being a reflection surface;
   a second optical system for guiding the light reflected by the scanned surface to an observer,
   wherein the first optical system and the second optical system have a common optical surface with a rotational asymmetry shape and a common phase plate that emits a light which has been incident into the phase plate by changing a state of polarization of the incident light, and
   wherein the common optical surface, in accordance with a polarization direction, serves as a transmissive plane with respect to either one of the first optical system and the second optical system and serves as a reflection plane with respect to the other optical system.

4. An image display apparatus comprising:
   a light source;
   a displaying optical system according to claim 3; and
   a modulation circuit that modulates a light emitted by the light source on a basis of an image signal.

* * * * *